(12) United States Patent
Bass et al.

(10) Patent No.: US 6,769,033 B1
(45) Date of Patent: Jul. 27, 2004

(54) NETWORK PROCESSOR PROCESSING COMPLEX AND METHODS

(75) Inventors: Brian Mitchell Bass, Apex, NC (US); Jean Louis Calvignac, Cary, NC (US); Anthony Matteo Gallo, Apex, NC (US); Marco C. Heddes, Raleigh, NC (US); Ross Boyd Leavens, Cary, NC (US); Piyush Chunilal Patel, Cary, NC (US); Mark Anthony Rinaldi, Durham, NC (US); Michael Steven Siegel, Raleigh, NC (US); Fabrice Jean Verplanken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,691

(22) Filed: Aug. 27, 1999

(51) Int. Cl.[7] .............................. G06F 9/00; G06F 15/16
(52) U.S. Cl. .......................................... 709/246; 712/36
(58) Field of Search .......................... 718/1, 100, 102, 718/105, 106, 107; 709/201, 230, 231, 232, 246; 370/335, 360, 389; 712/225, 36

(56) References Cited

U.S. PATENT DOCUMENTS

| | | | | |
|---|---|---|---|---|
| 4,703,475 A | * | 10/1987 | Dretzka et al. ............ 370/394 |
| 4,775,987 A | * | 10/1988 | Miller ........................ 375/260 |
| 5,008,878 A | | 4/1991 | Ahmadi et al. .............. 370/60 |
| 5,260,936 A | | 11/1993 | Bardet et al. ................ 370/61 |
| 5,357,632 A | * | 10/1994 | Pian et al. ................... 718/105 |
| 5,371,740 A | | 12/1994 | Mouro et al. ............... 370/85.1 |
| 5,379,297 A | * | 1/1995 | Glover et al. ............... 370/234 |
| 5,426,645 A | * | 6/1995 | Haskin ........................ 370/477 |
| 5,461,614 A | * | 10/1995 | Lindholm .................... 370/394 |
| 5,465,345 A | | 11/1995 | Blanc et al. ................. 395/200 |
| 5,524,007 A | | 6/1996 | White et al. ............ 370/85.11 |
| 5,550,978 A | * | 8/1996 | Takahashi et al. ........... 709/236 |
| 5,568,471 A | | 10/1996 | Hershey et al. ................ 370/17 |
| 5,583,868 A | | 12/1996 | Rashid et al. ............... 370/394 |
| 5,640,586 A | | 6/1997 | Pechanek et al. ............ 395/800 |
| 5,651,002 A | | 7/1997 | Van Seters et al. ......... 370/392 |
| 5,724,348 A | | 3/1998 | Basso et al. ................. 370/384 |
| 5,748,633 A | | 5/1998 | Lawler et al. ............... 370/401 |
| 5,748,905 A | * | 5/1998 | Hauser et al. ............... 709/249 |
| 5,787,430 A | | 7/1998 | Doeringer et al. ........... 707/100 |
| 5,828,903 A | * | 10/1998 | Sethuram et al. ............. 710/53 |
| 5,854,787 A | | 12/1998 | Dodge et al. ................ 370/349 |
| 5,864,535 A | | 1/1999 | Basilico ....................... 370/231 |
| 5,870,394 A | * | 2/1999 | Oprea ........................ 370/392 |
| 5,872,784 A | * | 2/1999 | Rostoker et al. ........ 370/395.64 |
| 5,894,477 A | | 4/1999 | Bruechkeimer et al. .... 370/353 |
| 5,898,667 A | | 4/1999 | Longfield et al. ........... 370/225 |
| 5,950,182 A | * | 9/1999 | Godbole et al. .............. 706/45 |

FOREIGN PATENT DOCUMENTS

WO 9916177 4/1999

OTHER PUBLICATIONS

Newman et al. IP Switching and Gigabit Routers pp. 1–8, 1/97.*

(List continued on next page.)

*Primary Examiner*—Larry D. Donaghue
(74) *Attorney, Agent, or Firm*—Joscelyn G. Cockburn

(57) ABSTRACT

A network processor useful in network switch apparatus and methods of operating such a processor in which data flow handling and flexibility is enhanced by the cooperation of an embedded processor complex with a suite of peripherals, all formed on a common semiconductor substrate. The interface processors provide data paths for inbound and outbound data flow and operate under the control of instructions stored in an instruction store formed on the semiconductor substrate, while storage of transiting data flow portions is provided by memory peripherals and interfaces to external memory elements.

27 Claims, 19 Drawing Sheets

OTHER PUBLICATIONS

IBM Technical Disclosure Bulletin, vol. 35, No. 2, Jul. 1992, 'Method for Universal MAC Frame Encoding'.

Davis, T.A., 'Rendering Computer Animations on a Network of Workstations', Published: Los Alamitos, CA, USA 1998 Proceedings of the First Merged International Parallel Processing Symposium . . . (Cat. No. 98TB100227), pp. 726–730.

Arran, M.H., 'Transputer Load–Balancing for a Parallel Frame–based KBS', ITI '93 Proceedings of the $15^{th}$ International Conference on Information Technology Interfaces, pp. 201–206, Published: Zagreb, Croatia, 1993.

Mitchell, L.C., 'Performance Analysis of a Fault Tolerant Computer System', Performance Evaluation Review, vol. 18, No. 1, pp. 249–250, May 1990.

* cited by examiner

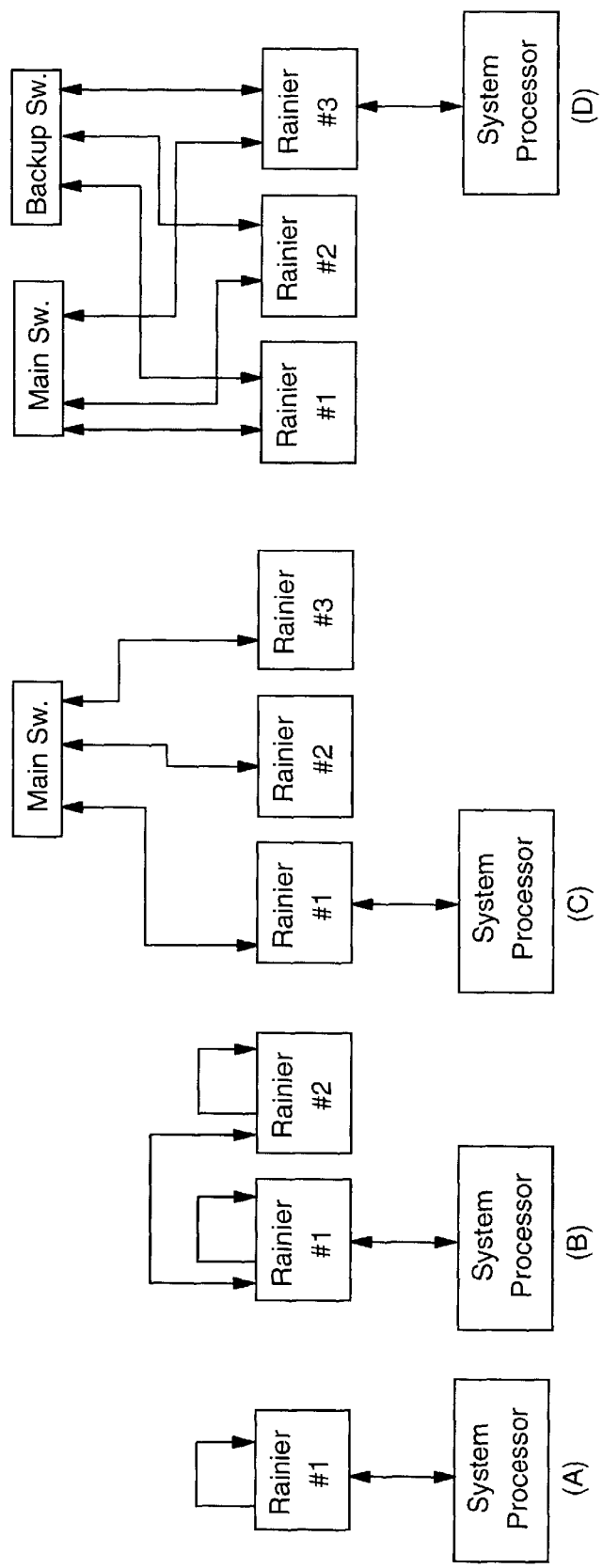
FIG. 2 System Configurations

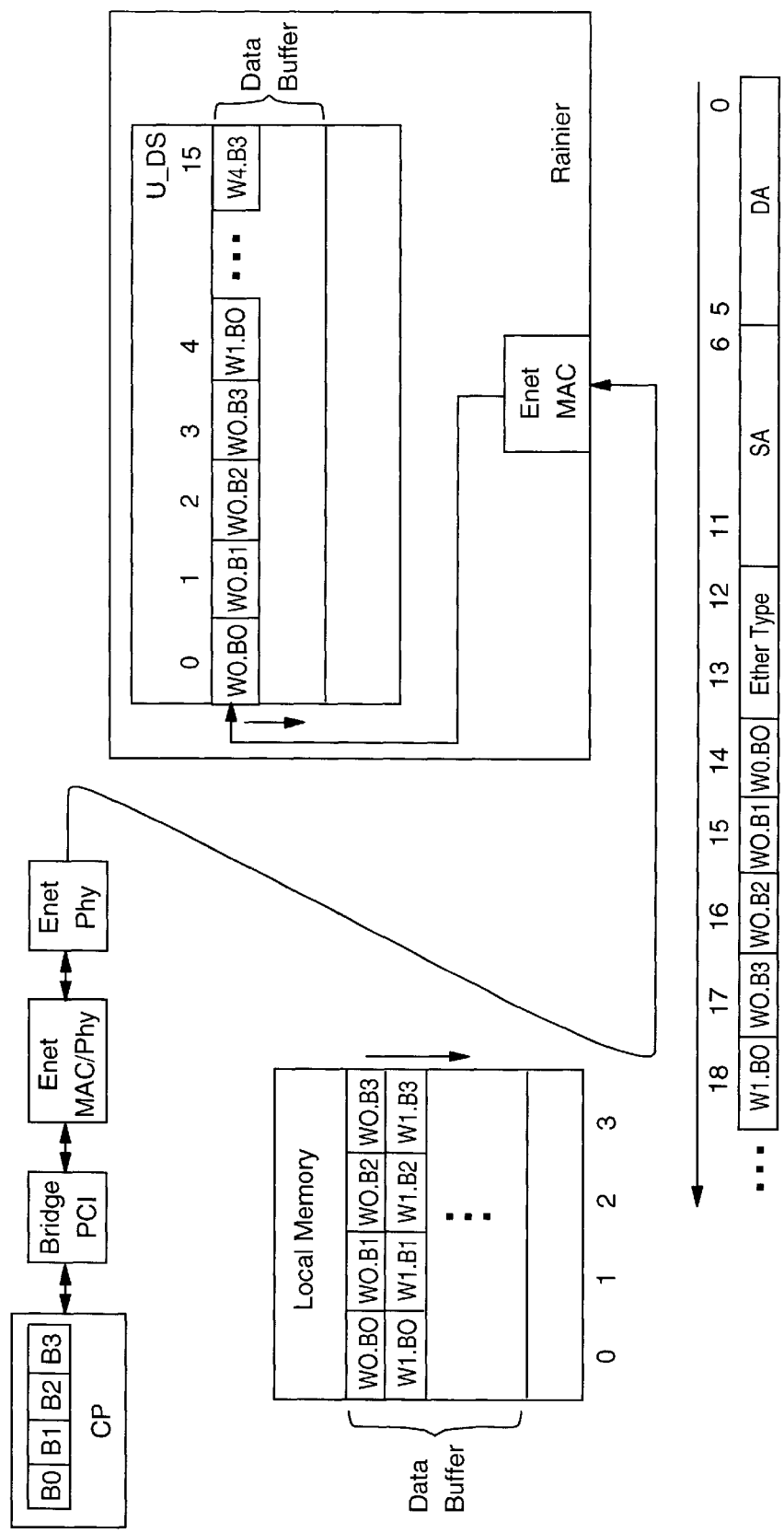
FIG. 3 Guided Traffic Data Flow (Ethernet Port)

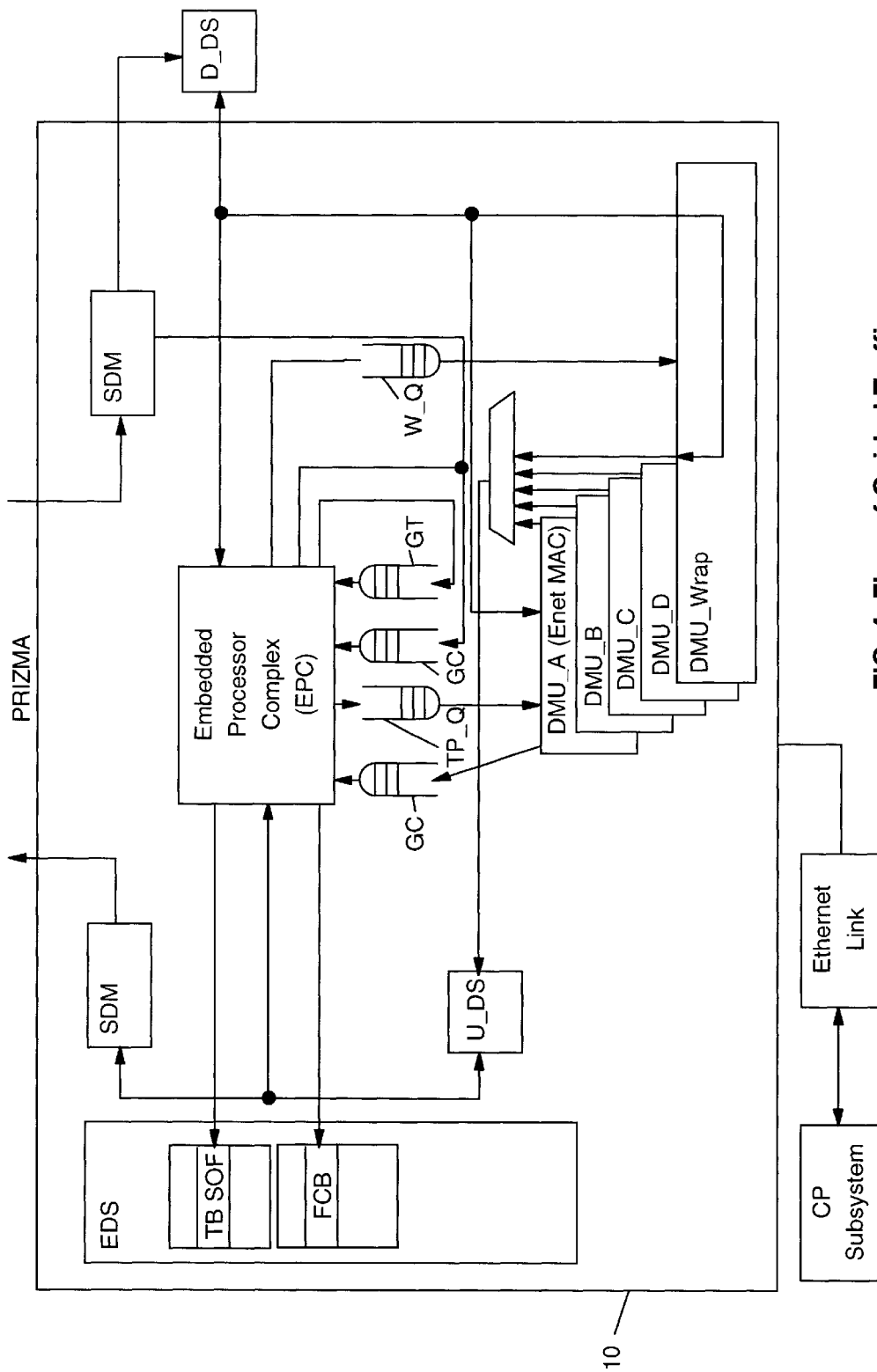
FIG. 4 Flow of Guided Traffic

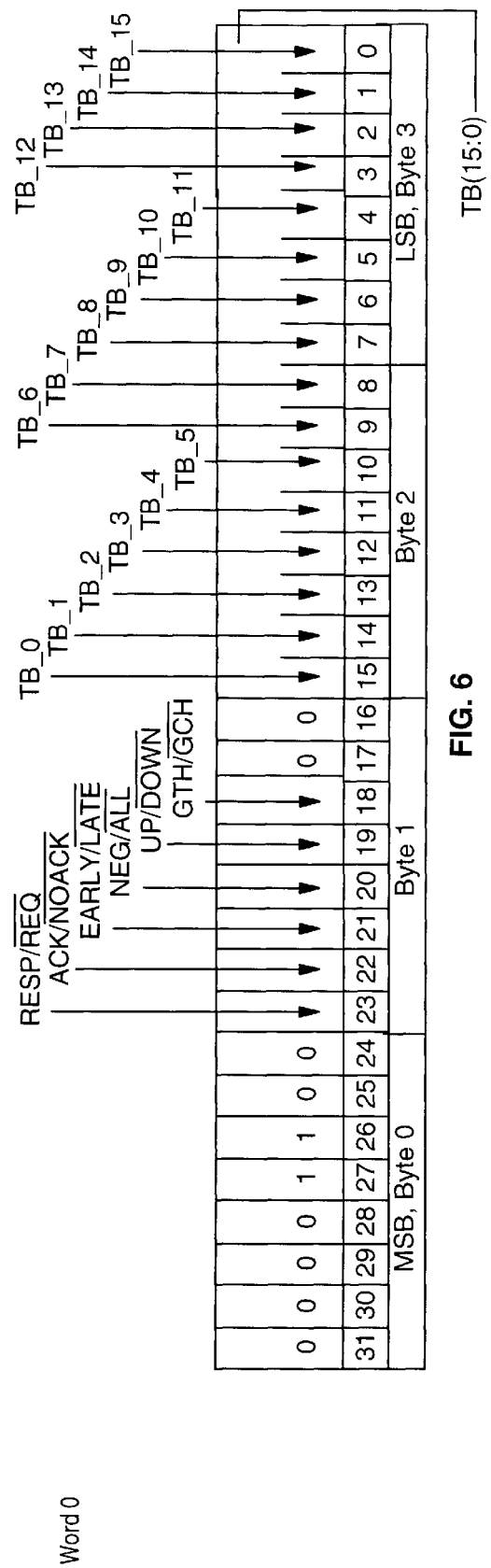

Word 1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | Correlator | | | | | | | | | | | | | | | | |
| MSB, Byte 0 | | | | | | | | Byte 1 | | | | | | | | Byte 2 | | | | | | | | LSB, Byte 3 | | | | | | | |

FIG. 7 Correlator

Word 2 Cmd Word 0

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | | | | | | | | | | L | | | | | | | | | Completion Code | | | | | res | | | | | GC Type | | |
| MSB, Byte 0 | | | | | | | | Byte 1 | | | | | | | | Byte 2 | | | | | | | | LSB, Byte 3 | | | | | | | |

FIG. 8 Command Control Information Format

Word 3 Cmd Word 1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | Address | | | | | | | | | | | | | | | | |
| MSB, Byte 0 | | | | | | | | Byte 1 | | | | | | | | Byte 2 | | | | | | | | LSB, Byte 3 | | | | | | | |

FIG. 9 Addressing Information Format

| Island ID | Structure Address | Element Address | Word Addr |
|---|---|---|---|
| 5 | 23 | 32 | 4 |

FIG. 10 General Form of Structure Addressing

| Island_ID | Island Name |
|---|---|
| '00000'b | UpData Store* |
| '00001'b | Up PMM |
| '00010'b | Up EDS |
| '00011'b | Up SDM |
| '00100'b | Embedded PRocessor Complex |
| '00101'b | SPM |
| '00110-00111'b | reserved |
| '01000'b | Control Memories* |
| '01001-01111'b | reserved |
| '10000'b | Down Data Store* |
| '10001'b | Down PMM |
| '10010'b | Down EDS |
| '10011'b | Down SDM |
| '10100'b | Configuration Registers |
| '10101'b | DASL |
| '10110-11111'b | reserved |
| *These islands are not accessible via the Web interface | |

FIG. 11 Addressing, Island Encoding

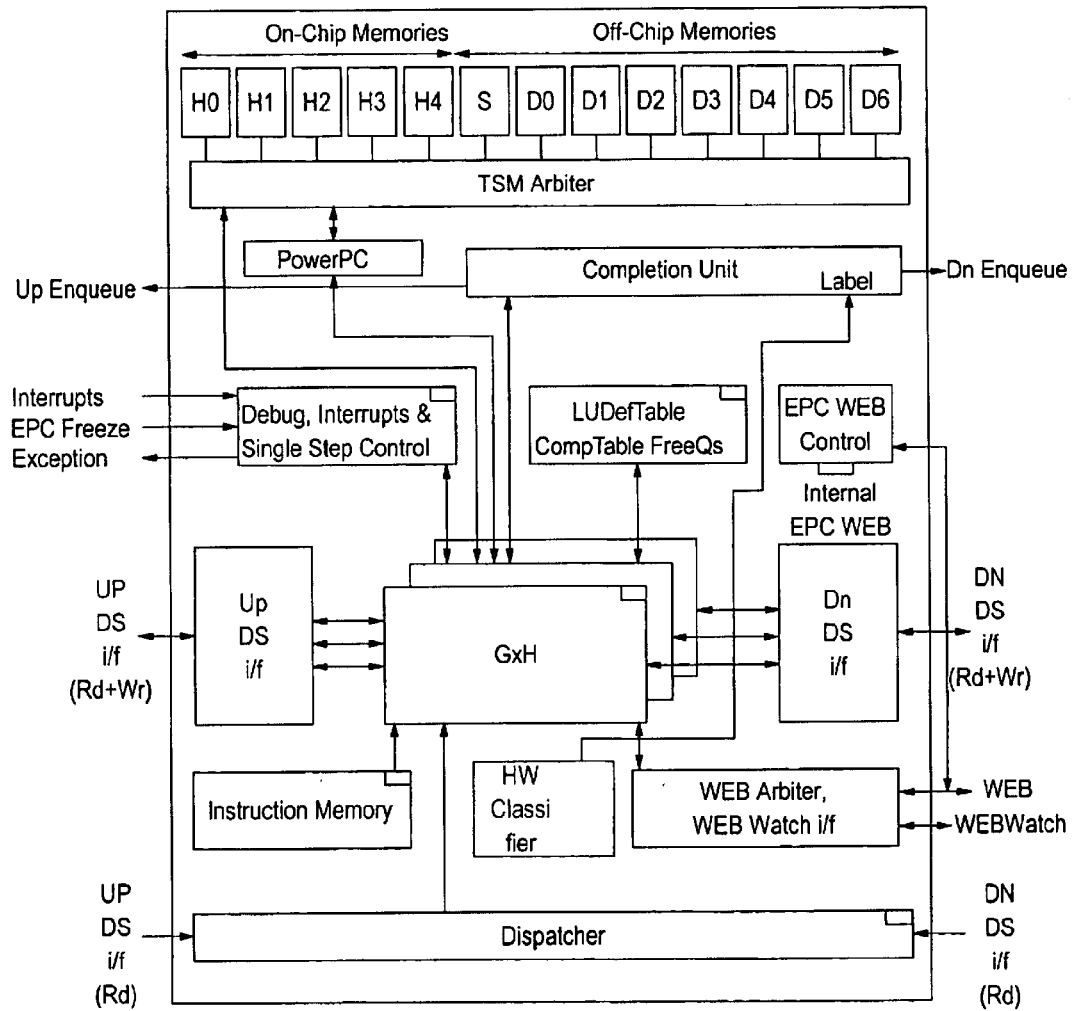
FIG. 12A    BLOCK DIAGRAM OF THE EPC

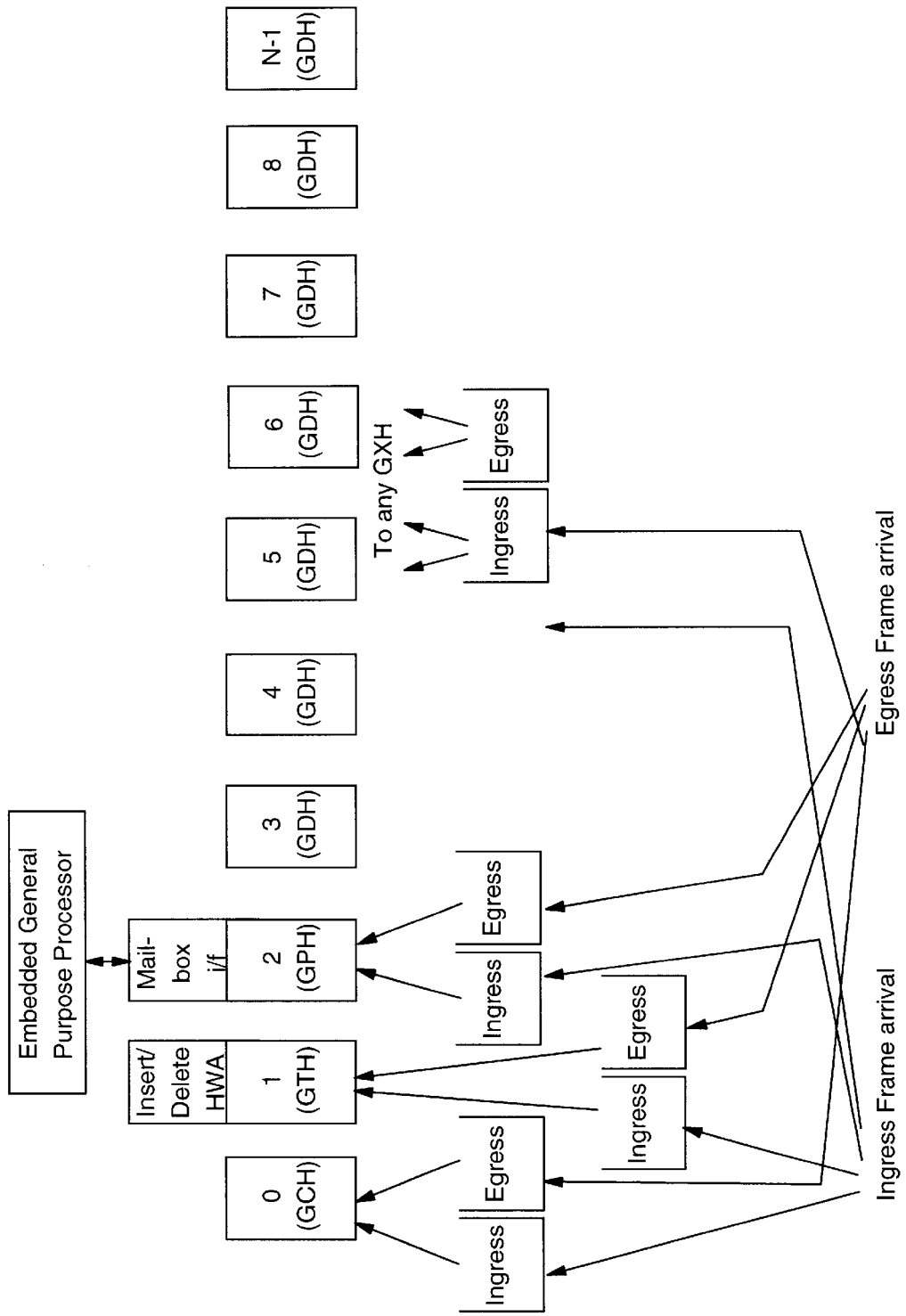
FIG. 12B The 10 GxHs

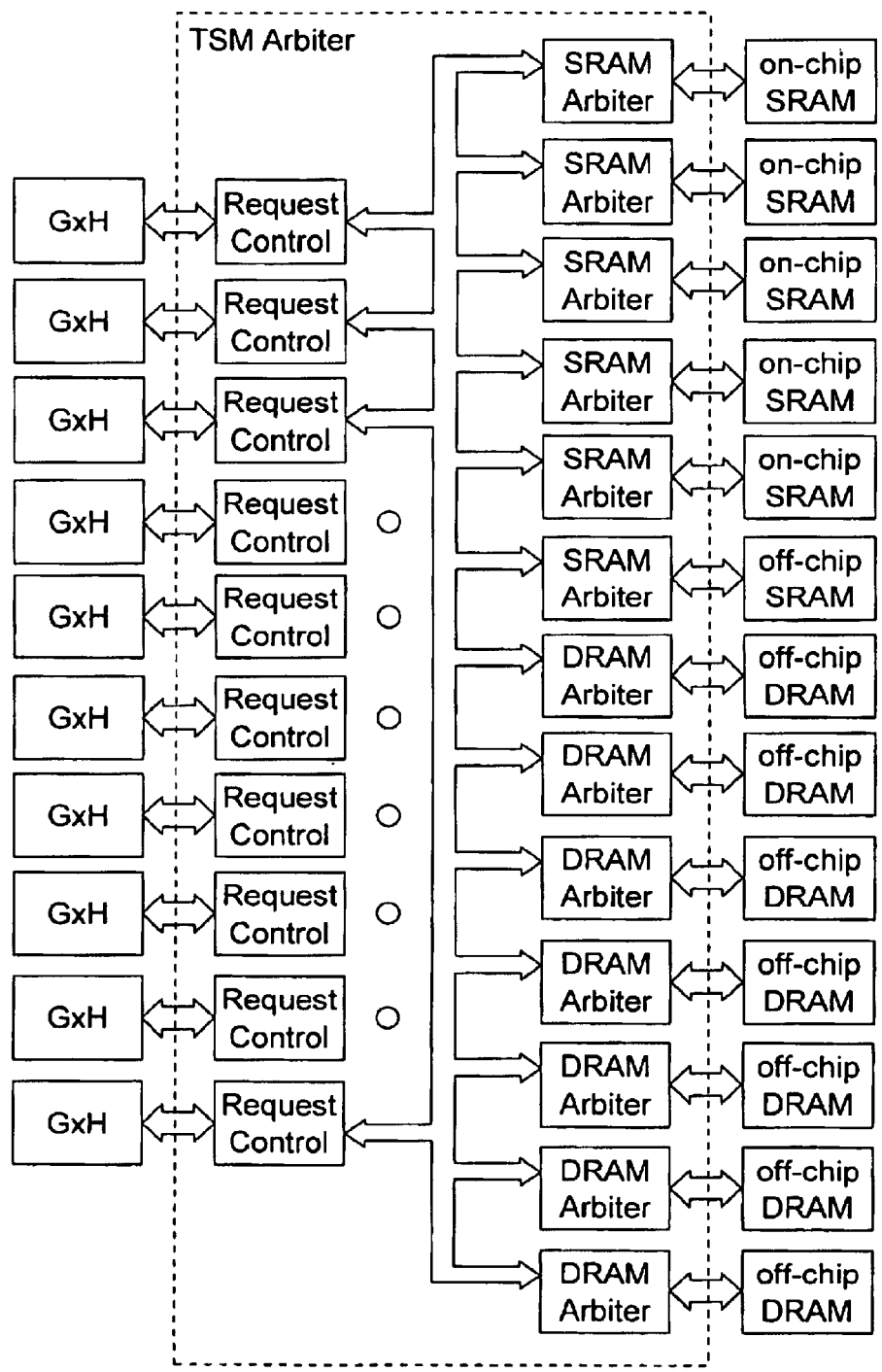
FIG. 13 (MEMORY COMPLEX)

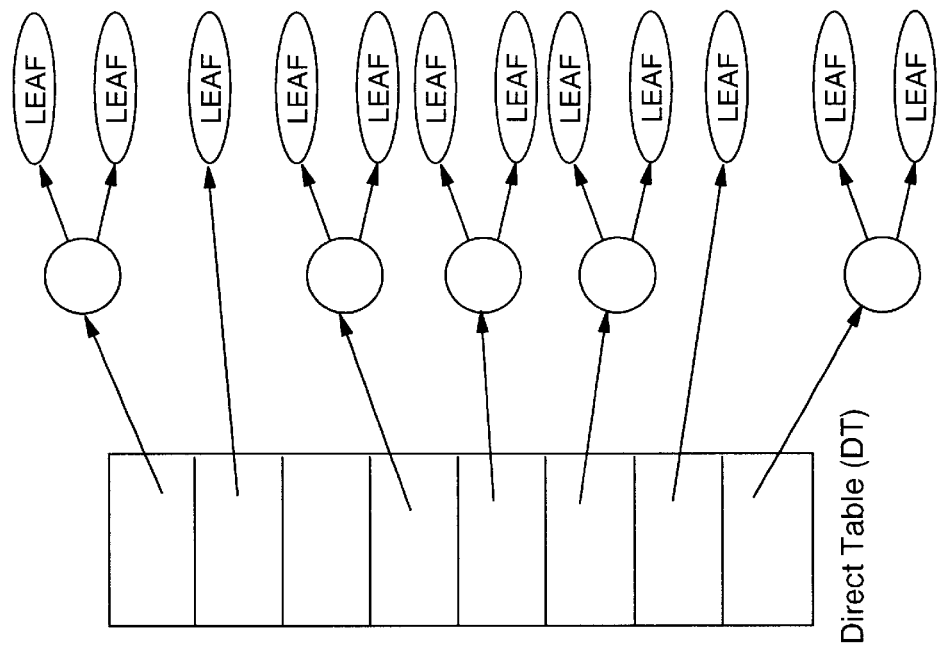
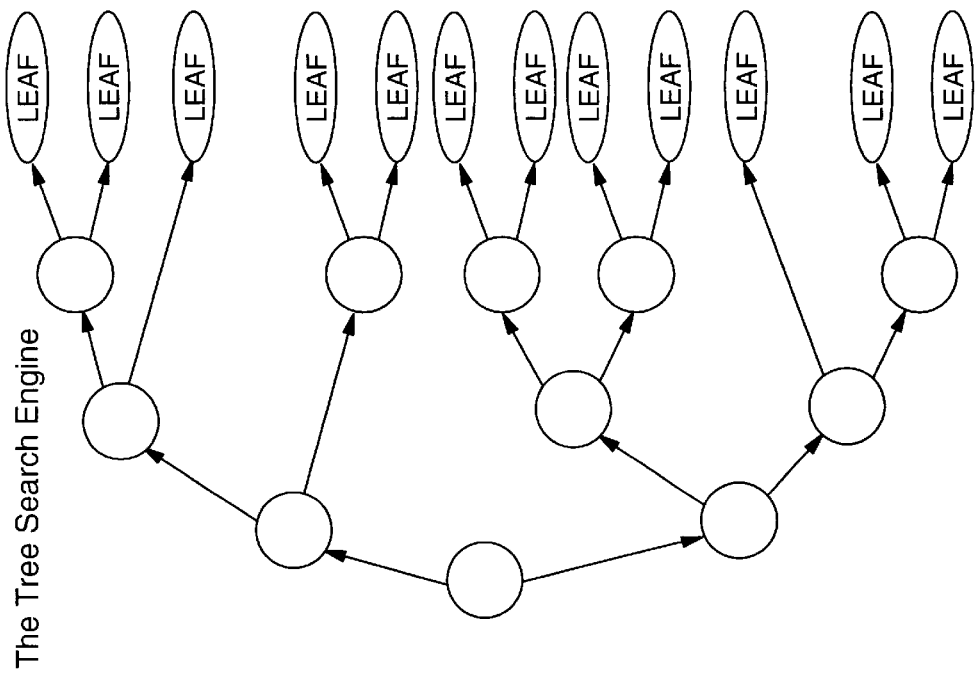
FIG. 15

NETWORK PROCESSOR PROCESSING COMPLEX AND METHODS

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. Pat. No. 5,008,878 issued 16 Apr. 1991 for High Speed Modular Switching Apparatus for Circuit and Packet Switched Traffic;

U.S. Pat. No. 5,724,348 issued 3 Mar. 1998 for Efficient Hardware/Software Interface for a Data Switch;

U.S. Pat. No. 5,787,430, issued 28 Jul. 1998 for Variable Length Data Sequence Back Tracking and Tree Structure;

U.S. patent application Ser. No. 09/312,148 filed May 14, 1999, and entitled "System Method and Computer Program for Filtering Using Tree Structure", now U.S. Pat. No. 6,298,340; and U.S. patent application Ser. No. 09/330,968 filed 11 Jun. 1999 and entitled "High Speed Parallel/Serial Link for Data Communications", now U.S. Pat. No. 6,222,380.

BACKGROUND OF THE INVENTION

This invention relates to communication network apparatus such as is used to link together information handling systems or computers of various types and capabilities and to components of such apparatus. In particular, this invention relates to scalable switch apparatus and components useful in assembling such apparatus. This invention relates to an improved and multi-functional interface device and the combination of that device with other elements to provide a media speed network switch. The invention also relates to methods of operating such apparatus which improve the data flow handling capability of network switches.

The description which follows presupposes knowledge of network data communications and switches and routers as used in such communications networks. In particular, the description presupposes familiarity with the ISO model of network architecture which divides network operation into layers. A typical architecture based upon the ISO model extends from Layer 1 (also sometimes identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

In today's networked world, bandwidth is a critical resource. Increasing network traffic, driven by the Internet and other emerging applications, is straining the capacity of network infrastructures. To keep pace, organizations are looking for better technologies and methodologies to support and manage traffic growth and the convergence of voice with data.

Today's dramatic increase in network traffic can be attributed to the popularity of the Internet, a growing need for remote access to information, and emerging applications. The Internet alone, with its explosive growth in e-commerce, has placed a sometimes insupportable load on network backbones. It is also the single most important cause of increased data traffic volumes that exceed voice traffic for the first time. The growing demands of remote access applications, including e-mail, database access, and file transfer, are further straining networks.

The convergence of voice and data will play a large role in defining tomorrow's network environment. Currently, the transmission of data over Internet protocol (IP) networks is free. Because voice communications will naturally follow the path of lowest cost, voice will inevitably converge with data. Technologies such as Voice over IP (VoIP), Voice over ATM (VoATM), and Voice over Frame Relay (VoFR) are cost-effective alternatives in this changing market. However, to make migration to these technologies possible, the industry has to ensure quality of service (QoS) for voice and determine how to charge for voice transfer over data lines. The Telecommunications Deregulation Act of 1996 further complicates this environment. This legislation will reinforce a symbiotic relationship between the voice protocol of choice, ATM, and the data protocol of choice, IP.

Integrating legacy systems is also a crucial concern for organizations as new products and capabilities become available. To preserve their investments in existing equipment and software, organizations demand solutions that allow them to migrate to new technologies without disrupting their current operations.

Eliminating network bottlenecks continues to be a top priority for service providers. Routers are often the source of these bottlenecks. However, network congestion in general is often misdiagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

For remote access applications, performance, bandwidth-on-demand, security, and authentication rank as top priorities. The demand for integration of QoS and CoS, integrated voice handling, and more sophisticated security solutions will also shape the designs of future remote access network switches. Further, remote access will have to accommodate an increasing number of physical mediums, such as ISDN, T1, E1, OC-3 through OC-48, cable, and xDSL modems.

Industry consultants have defined a network processor (herein also mentioned as an "NP") as a programmable communications integrated circuit capable of performing one or more of the following functions:

Packet classification—identifying a packet based on known characteristics, such as address or protocol Packet modification—modifying the packet to comply with IP, ATM, or other protocols (for example, updating the time-to-live field in the header for IP)

Queue/policy management—reflects the design strategy for packet queuing, de-queuing, and scheduling of packets for specific applications Packet forwarding—transmission and receipt of data over the switch fabric and forwarding or routing the packet to the appropriate address Although this definition is an accurate description of the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric, and IP packet handling and learning capabilities. NPs target ISO layer two through five and are designed to optimize network-specific tasks.

The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs. With processor-model NPs, NEVs benefit from reduced non-refundable engineering costs and improved time-to-market.

BRIEF SUMMARY OF THE INVENTION

One purpose of this invention is to provide a scalable switch architecture for use in a data communication network which is capable of sizing support capabilities to a range of potential demands while improving the speed of handling of data being transferred. This purpose is pursued by providing components, and assemblages of components, which remove from the workload of processing units involved a greater amount of data handling than has been the case heretofore.

Another purpose is to provide an interface device or network processor (the terms being used interchangeably) which includes a plurality of sub-assemblies integrated on a single substrate and coacting to provide media rate switching of frames that include layer 2, layer 3, layer 4 and layer 5. The interface device may be used as a standalone solution providing a first level of capability for a work group switch, an interconnected solution providing a higher level of capability work group switch or scaled further upward in capability by cooperation with a switching fabric device.

BRIEF DESCRIPTION OF THE DRAWINGS

Some of the purposes of the invention having been stated, others will appear as the description proceeds, when taken in connection with the accompanying drawings, in which:

FIGS. 2A through 2D show the interface device interconnected with other components in different system configurations.

FIG. 3 shows the flow and processing of an encapsulated guided frame.

FIG. 4 shows the flow and processing of an internal guided frame.

FIG. 5 shows generalized format for a Guided Cell.

FIG. 6 shows the format for Frame Control Information.

FIG. 7 shows the format for the Correlator.

FIG. 8 shows Command Control Information Format.

FIG. 9 shows Addressing Information Format.

FIG. 10 shows General Form of Structure Addressing.

FIG. 11 shows chart for Addressing, Island Encoding.

FIG. 12A shows a block diagram of the Embedded Processor Complex.

FIG. 12B shows a schematic of the Embedded Processors.

FIG. 13 shows a block diagram of the memory complex.

FIG. 15 shows flows illustrating Data Structure without using a Direct Table and with using a Direct Table.

DESCRIPTION OF THE PREFERRED EMBODIMENT(S)

Figure 1:
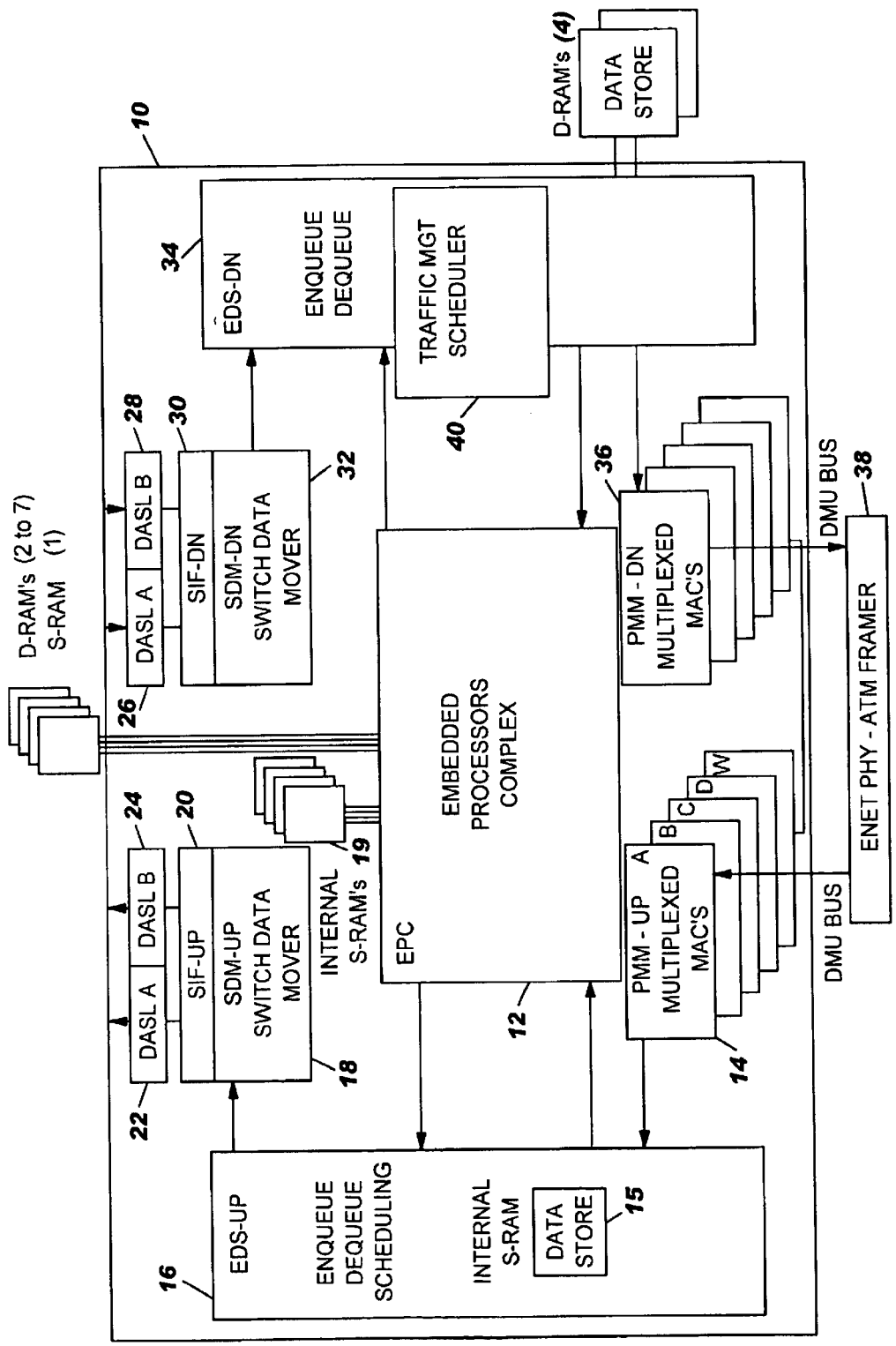
FIG. 1 shows a block diagram for an interface device in accordance with this invention.

While the present inventions will be described more fully hereinafter with reference to the accompanying drawings, in which preferred embodiments of the present inventions are shown, it is to be understood at the outset of the description which follows that persons of skill in the appropriate arts may modify the inventions here described while still achieving the favorable results of the inventions. Accordingly, the description which follows is to be understood as being a broad, teaching disclosure directed to persons of skill in the appropriate arts, and not as limiting upon the present inventions.

Apparatus disclosed here is scalable and capable of functioning to interconnect desktop or workgroup switches, aggregate such switches into a network backbone, and provide backbone switching services. The apparatus can support Layer 2, Layer 3, and Layer 4+ forwarding in hardware. Certain forms of the apparatus are designed for desktop or workgroup switch aggregation and while others are targeted as core backbone switches.

The architecture used for the apparatus is based on an interface device or network processor hardware subsystem and a software library running on a control point, all as more fully described elsewhere in this document. The interface device or network processor subsystem is a high performance frame forwarding engine designed for parsing and translation of L2, L3, and L4+ protocol headers. This allows protocols to be switched at greater speeds using hardware. The interface device or network processor subsystem provides a fast-path through the box while the software library and control point processor provide management and route discovery functions needed to maintain the fast-path. The control point processor and the software library running thereon together define the Control Point (CP) of the system. The CP is where the actual bridging and routing protocols such as Transparent Bridging and OSPF are run. It can also be referred to as the slow-path of the system.

While the apparatus here disclosed supports multi-layer forwarding in hardware it can also operate as a L2 only switch and that is its default mode of operation in the simplest form disclosed. Each port will be put into a single domain allowing any device to communicate with any other device. The apparatus is configurable at L2 allowing system administrators the ability to configure features such as; grouping ports into separate domains or trunks, configuring Virtual LAN (VLAN) segments, or filters to control broadcast and multicast traffic.

This scalable apparatus has many benefits. First, it allows the system administrator the ability to configure L3 forwarding and routing of IP and IPX traffic using the same hardware being used for L2 and at the same speed. Second, it removes the need for using external routers to interconnect campus buildings while increasing performance at the same time. Third, it simplifies or combines the management of L2/L3 service for a building into a single point of control. Finally, it provides value added features with L4+ functions that allow system administrators the ability to assign different traffic classifications to support mission critical applications and network dispatcher for load-balancing among servers.

The apparatus is designed to be a modular unit using an interface device or network processor, a Control Point (CP), and an optional switching fabric device as its fundamental building blocks. The interface device preferably provides L2/L3/L4+ fast-path forwarding services while the CP provides the management and route discovery functions needed to maintain the fast-path. The optional switching fabric device is used when more than two interface device subsystems are tied together. The optional switching fabric device may be as disclosed in U.S. Pat. No. 5,008,878 issued 16 Apr. 1991 for High Speed Modular Switching Apparatus for Circuit and Packet Switched Traffic mentioned hereinabove and incorporated herein by reference.

The apparatus is anticipated to be assembled using printed circuit board elements also here mentioned as "blades". The printed circuit board elements have circuit elements mounted thereon and are received in connectors provided in apparatus housings. Similar devices are also know as "option cards". The apparatus contemplates that blades can be exchanged among varying chassis or housings, provided that appropriate connectors and backplane electrical connections are provided. The basic component found on all blades is a carrier subsystem. Starting with the carrier subsystem, three types of blades can be produced. The first type is a CP only Blade, which consists of a carrier subsystem and a CP subsystem. The primary use of a CP only blade is for a product where redundancy is the primary concern. The second type is a CP+Media Blade, which consists of a carrier subsystem, a CP subsystem, and 1-to-3 media subsystems. The primary use of a CP+Media blade is a product where port density is deemed more important than redundancy. The third type is a Media Blade, which consists of a carrier subsystem and 1-to-4 media subsystems. The media blades can be used in any chassis and the type of media subsystem used is configurable.

Blade management will involve fault detection, power management, new device detection, initialization, and configuration. This management will be done using various registers, I/O signals, and a guided cell interface that is used to communicate between the CP and carrier subsystems. However, unlike the chassis there does exist programmable devices and memory on all blades. The amount of programmability depends on the type of blade. When the CP subsystem exists on a blade both the CP and carrier subsystems are programmable. The media subsystems are also programmable but only indirectly through the carrier subsystem.

In higher capability products there also exists a Switch Blade which contains the switching fabric device subsystem. The management of this blade will involve fault detection, power management, new device detection, and initialization. This management will be done using various registers and I/O signals that will be mapped into the CP subsystem.

In its simplest form, a switch apparatus contemplated by this invention has a control point processor; and an interface device operatively connected to the control point processor. Preferably and as here disclosed, the interface device (also known as a network processor) is a unitary Very Large Scale Integrated (VLSI) circuit device or chip which has a semiconductor substrate; a plurality of interface processors formed on the substrate; internal instruction memory formed on said substrate and storing instructions accessibly to the interface processors; internal data memory formed on the substrate and storing data passing through the device accessibly to the interface processors; and a plurality of input/output ports. The interface processors are also sometimes herein identified as picoprocessors or processing units. The ports provided include at least one ports connecting the internal data memory with external data memory and at least two other ports exchanging data passing through the interface device with an external network under the direction of the interface processors. The control point cooperates with the interface device by loading into the instruction memory instructions to be executed by the interface processors in directing the exchange of data between the data exchange input/output ports and the flow of data through the data memory.

The network processor here disclosed is deemed inventive apart from the switch assemblies into which it is incorporated. Further, the network processor here disclosed is deemed to have within its elements here described other and further inventions not here fully discussed.

FIG. 1 shows a block diagram for the interface device chip that includes substrate 10 and a plurality of sub-assemblies integrated on the substrate. The sub-assemblies are arranged into an Upside configuration and a Downside configuration. As used herein, "Upside" refers to data flows inbound from a network to the apparatus here disclosed, while "Downside" refers to data outbound from the apparatus to a network serviced by the apparatus. The data flow follows the respective configurations. As a consequence, there is an Upside data flow and a Downside data flow. The sub-assemblies in the Upside include Enqueue-Dequeue-Scheduling UP (EDS-UP) logic 16, multiplexed MAC's-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in copending U.S. patent application Ser. No. 09/330,968 filed 11 Jun. 1999 and entitled "High Speed Parallel/Serial Link for Data Communication" mentioned hereinabove and incorporated by reference hereinto. While the preferred form of the apparatus of this invention here disclosed uses a DASL link, the present invention contemplates that other forms of links may be employed to achieve relatively high data flow rates, particularly where the data flows are restricted to being within the VLSI structure.

The sub-assemblies in the downside include DASL-A 26, DASL-B 28, SIF 30, SDM-DN 32, EDS-DN 34, and PPM-DN 36. The chip also includes a plurality of internal S-RAM's, Traffic Mgt Scheduler 40, and Embedded Processor Complex (EPC) 12. An interface device 38 is coupled by respective DMU Busses to PMM 14 and 36. The interface 38 could be any suitable L1 circuitry, such as ethernet Physical (ENET PHY), ATM Framer, etc. The type of interface is dictated in part by the network media to which the chip is connected. A plurality of external D-RAM's and S-RAM are available for use by the chip.

While here particularly disclosed for networks in which the general data flow outside the relevant switching and routing devices is passed through electrical conductors such as wires and cables installed in buildings, the present invention contemplates that the network switches and components thereof here disclosed may be used in a wireless environment as well. By way of an illustrative example, the media access control (MAC) elements here described may be replaced by suitable radio frequency elements, possibly using known Silicon Germanium technology, which would result in a capability to link the elements here described directly to a wireless network. Where such technology is appropriately employed, the radio frequency elements can, by person of appropriate skill in the applicable arts, be integrated into the VLSI structures here disclosed. Alternatively, radio frequency or otherwise wireless response devices such as infrared responsive devices can be mounted on a blade with other elements here disclosed to achieve a switch apparatus useful with wireless network systems.

The arrows show the general flow of data within the Interface device. Frames received from an Ethernet MAC are placed in internal Data Store buffers by the EDS-UP. These frames are identified as either normal Data Frames or system control Guided Frames and enqueued to the EPC (FIG. 1). The EPC contains N protocol processors capable of working on up to N frames in parallel (N>1). In an embodiment of ten protocol processor (FIG. 12B), two of the ten protocol processors are specialized; one for handling Guided Frames (the Generic Central Handler or GCH) and one for building Lookup Data in Control Memory (the Generic Tree Handler or GTH). As shown in FIG. 12A, the EPC also contains a dispatcher which matches new frames with idle processors, a completion unit which maintains frame sequence, a Common Instruction memory shared by all ten processors, a Classifier Hardware Assist which determines frame classification and coprocessor which helps determine the starting instruction address of the frame, Ingress and Egress Data Store interfaces which control read and write operations of frame buffers, a Control Memory Arbiter which allows the ten processors to share Control Memory, a Web Control, Arbiter and interface that allows debug access to internal Interface device data structures, as well as other hardware constructs.

Guided Frames are sent by the dispatcher to the GCH processor as it becomes available. Operations encoded in the Guided Frame are executed, such as register writes, counter reads, Ethernet MAC configuration changes, and so on. Lookup table alterations, such as adding MAC or IP entries, are passed on to the Lookup Data processor for Control Memory operations, such as memory reads and writes. Some commands, such as MIB counter reads, require a response frame to be built and forwarded to the appropriate port on the appropriate Interface device. In some cases, the Guided Frame is encoded for the Egress side of Interface device. These frames are forwarded to the Egress side of the Interface device being queried, which then executes the encoded operations and builds any appropriate response frame.

Data frames are dispatched to the next available protocol processor for performing frame lookups. Frame data are passed to the protocol processor along with results from the Classifier Hardware Assist (CHA) Engine. The CHA parses IP or IPX. The results determine the Tree Search algorithm and starting Common Instruction Address (CIA). Tree Search algorithms supported included Fixed Match Trees (fixed size patterns requiring exact match, such as Layer 2 Ethernet MAC tables), Longest prefix Match Trees (variable length patterns requiring variable length matches, such as subnet IP forwarding) and Software Managed Trees (two patterns defining either a range or a bit mask set, such as used for filter rules).

Lookup is performed with the aid of the Tree Search Engine (TSE) Coprocessor, which is a part of each protocol processor. The TSE Coprocessor performs Control memory accesses, freeing the protocol processor to continue execution. Control memory stores all tables, counters, and other data needed by the picocode. Control memory operations are managed by the Control memory Arbiter, which arbitrates memory access among the ten processor complexes.

Frame data are accessed through the Data Store Coprocessor. The Data Store Coprocessor contains a primary data buffer (holding up to eight 16 byte segments of frame data), a scratch pad data buffer (also holding up to eight 16-byte segments of frame data) and some control registers for Data Store operations. Once a match is found, Ingress frame alterations may include a VLAN header insertion or overlay. This alteration is not performed by the interface device processor complex, but rather hardware flags are derived and other Ingress Switch Interface hardware performs the alterations. Other frame alterations can be accomplished by the picocode and the Data Store Coprocessor by modifying the frame contents held in the Ingress Data Store.

Other data are gathered and used to build Switch Headers and Frame Headers prior to sending frames to the switch fabric device. Control data include switch information, such as the destination blade of the frame, as well as information for the Egress Interface device, helping it expedite frame lookup of destination ports, multicast or unicast operations, and Egress Frame alterations.

Upon completion, the Enqueue Coprocessor builds the necessary formats for enqueuing the frame to the switch fabric and sends them to the Completion Unit. The Completion Unit guarantees frame order from the ten protocol processors to the switch fabric queues. Frames from the switch fabric queues are segmented into 64 byte cells with Frame Header bytes and Switch Header bytes inserted as they are transmitted to the Prizma-E Switch.

Frames received from the switch fabric are placed in Egress Data Store (Egress DS) buffers by an Egress EDS (34) and enqueued to the EPC. A portion of the frame is sent by the dispatcher to an idle protocol processor for performing frame lookups. Frame data are dispatched to the protocol processor along with data from the Classifier Hardware Assist. The Classifier Hardware Assist uses frame control data created by the Ingress Interface device to help determine the beginning Code Instruction Address (CIA).

Egress Tree Searches support the same algorithms as supported for Ingress Searches. Lookup is performed with the TSE Coprocessor, freeing the protocol processor to continue execution. All Control memory operations are managed by the Control memory Arbiter, which allocates memory access among the ten processor complexes.

Egress frame data are accessed through the Data Store Coprocessor. The Data Store Coprocessor contains a primary data buffer (holding up to eight 16-byte segments of frame data), a scratch pad data buffer (also holding up to eight 16-byte segments of frame data) and some control registers for Data Store operations. The result of a successful lookup contains forwarding information and, in some cases, frame alteration information. Frame alterations can include VLAN header deletion, Time to Live increment (IPX) or decrement (IP), IP Header Checksum recalculation, Ethernet frame CRC overlay or insertion and MAC DA/SA overlay or insertion. IP Header checksums are prepared by the Checksum Coprocessor. Alterations are not performed by the Interface device Processor Complex, but rather hardware flags are created and PMM Egress hardware performs the alterations. Upon completion, the Enqueue Coprocessor is used to help build the necessary formats for enqueuing the frame in the EDS Egress queues and sending them to the Completion Unit. The Completion Unit guarantees frame order from the ten protocol processors to the EDS Egress queues feeding the egress Ethernet MACs 36.

The completed frames are finally sent by PMM Egress hardware to the Ethernet MACs and out the Ethernet ports.

An internal bus, referred to as the Web, allows access to internal registers, counters and memory. The Web also includes an external interface to control instruction step and interrupt control for debugging and diagnostics.

Tree Search Engine coprocessor provides memory range checking, illegal memory access notification and performs tree search instructions (such as memory read, write or read-add-write) operating in parallel with protocol processor execution.

Common Instruction Memory consists of one 1024×128 RAM and two sets of Dual 512×128 RAM. Each set of Dual RAMs provides two copies of the same picocode, allowing processors independent access to instructions within the same address range. Each 128-bit word includes four 32-bit instructions, providing a total range of 8192 instructions.

The Dispatcher controls the passing of frames to the ten protocol processors and manages interrupts and timers.

The Completion Unit guarantees frame order from the processor complex to the switch fabric and target port queues. A rich instruction set includes conditional execution, packing (for input hash keys), conditional branching, signed and unsigned operations, counts of leading zeros and more.

The Classifier Hardware Assist engine pakses each frame's layer 2 and layer 3 protocol header and provides this information with frames as they are dispatched to the protocol processors.

The Control memory Arbiter controls processor access to both internal and external memory.

External Control memory options include 5 to 7 DDR DRAM subsystems each supporting a pair of 2M×16 bit×4 bank or a pair of 4M×16 bit×4 bank DDR DRAMs. The DDR DRAM interface runs at a 133 MHZ clock rate and a 266 MHZ data strobe supporting configurable CAS latency and drive strength. An optional 133 MHZ ZBT SRAM can be added in either a 128K×36, 2×256K×18 or 2×512K×18 configuration.

Egress frames may be stored in either one External Data Buffer (e.g. DS0) or two External Data Buffers (DS0 and DS1). Each Buffer can be comprised of a pair of 2M×16 bit×4 bank DDR DRAM (storing up to 256K 64-byte frames) or a pair of 4M×16 bit×4 bank DDR DRAM (storing up to 512K 64-byte frames). Choose the single External Data Buffer (e.g. DS0) for 2.28 Mbps or add the second Buffer (e.g. DS1) to support 4.57 Mbps layer 2 and layer 3 switching. Adding the second Buffer improves performance, but it does not increase frame capacity. The External Data Buffer interface runs at a 133 MHZ clock rate with a 266 MHZ data strobe and supports configurable CAS latency and drive strength.

Internal Control memory includes two 512×128 bit RAMs, two 1024×36 bit RAMs and one 1024×64 bit RAM.

Internal Data storage provides buffering for up to 2048 64-byte frames in the Ingress direction (UP).

Fixed Frame alterations include VLAN tag insertions in the Ingress direction and VLAN tag deletions, Time To Live increment/decrement (IP, IPx), Ethernet CRC overlay/insert and MAC DA/SA overlay/insert in the Egress (DOWN) direction.

Port mirroring allows one receive port and one transmit port to be copied to a system designated observation port without using protocol processor resources. Mirrored Interface device ports are configured to add frame and switch control data. A separate data path allows direct frame enqueuing to the Ingress Switch interface.

The interface device integrates four Ethernet macros. Each macro can be individually configured to operate in either 1 Gigabit or 10/100 Fast Ethernet modes. Each Ethernet macro supports the following:

Up to ten 10/100 Mbps MACs or one 1000 Mbps MACs for each of four macros.

Figure 1A:
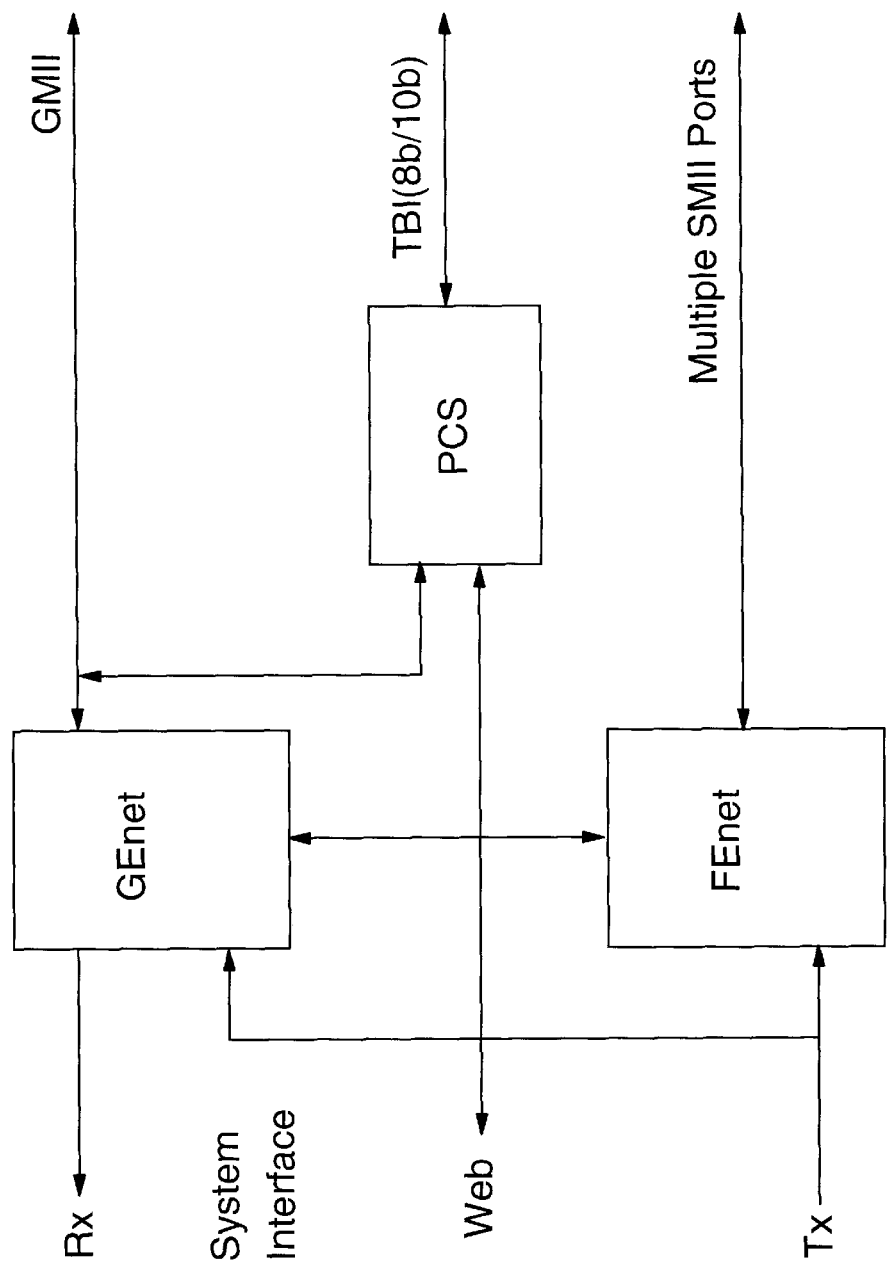
FIG. 1A shows a block diagram for the MAC.

FIG. 1A shows a block diagram of the MAC core. Each macro includes three Ethernet Core designs; to wit, the multiport 10/100 Mbps MAC Core (Fenet), the 1000 Mbps MAC core (Genet) and the 100 Mbps Physical Coding Sublayer Core (PCS).

Multi-Port Ethernet 10/100 MAC Features:
  Supports ten Serial Medium Independent Interfaces to the physical layer
  Capable of handling ten ports of 10 Mbps or 100 Mbps media speeds, any speed mix
  A single MAC services all ten ports with a Time Division Multiplex interface
  Supports Full/Half duplex operations at media speed on all ports
  Supports IEEE 802.3 Binary Exponential Backoff
1000 Mbps Ethernet MAC Core Features:
  Supports Gigabit Medium Independent Interface (GMII) to the physical PCS layer or directly to the physical layer
  With the PCS Core, supports a complete TBI (8 b/10 b) solution
  Supports Full duplex Point-to-Point connections at media speed
  Supports the IBM PCS Core valid byte signalling
1000 Mbps Ethernet Physical Coding Sublayer Core Features:
  Performs 8 b/10 b encoding and decoding
  Supports the PMA (10 bit) Service Interface as defined in IEEE 802.3z, this interface attaches to any PMA that is compliant with IEEE 802.3z
  Synchronizes data received from the PMA (two phase clock) with the MAC (single phase) clock
  Supports Auto-Negotiation including two next pages
  Converts from a two phase clock system defined in the standards to a single phase clock
  Provides a signal to the MAC indicating those clock cycles that contain new data
  Checks the received code groups (10 bits) for COMMA's and establishes word sync
  Calculates and checks the 8 b/10 b running disparity FIGS. 2A–2D show different configurations for the Interface device Chip. The configurations are facilitated by DASL and connection to a switching fabric device. Each DASL includes two channels; namely, a transmit channel and a receiver channel.

FIG. 2A shows a wrap configuration for a single Interface device. In this configuration, the transmit channel is wrapped to the receive channel.

FIG. 2B shows the configuration in which two Interface device Chips are connected. Each Interface device Chips is provided with at least two DASLs. In this configuration, the channels on one DASL on one chip are operatively connected to the channels of a matching DASL on the other chip. Eachother DASL channel on the chip is wrapped.

FIG. 2C shows the configuration in which multiple Interface devices are connected to a switch fabric. The double headed arrows indicate transmission in both direction.

FIG. 2D shows the configuration in which a Main switch and a Backup switch are connected to Multiple Interface devices. If the main switch goes down, the backup is available for use.

Figure 17:
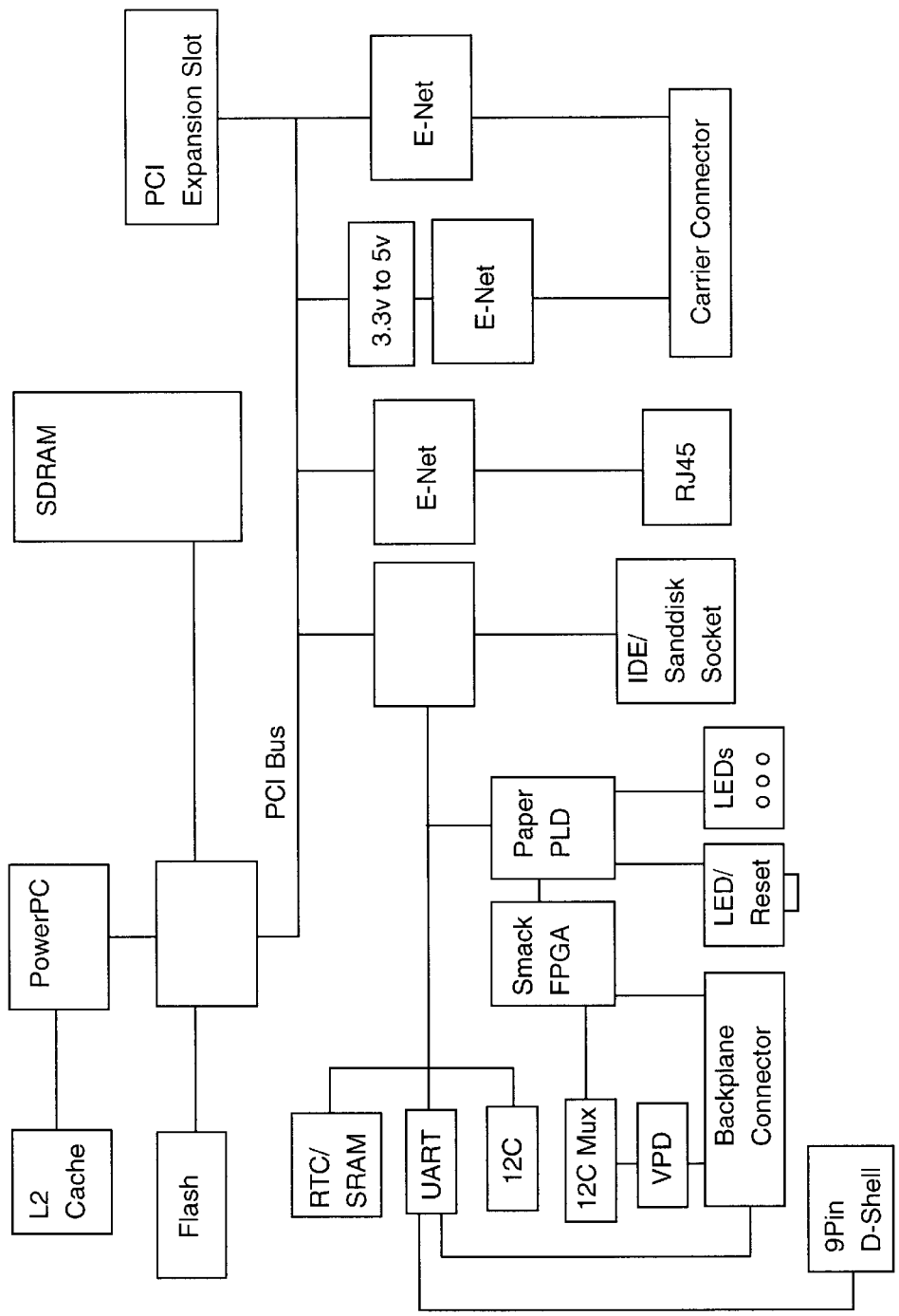
FIG. 17 shows a block diagram of a CP.

A Control Point (CP) includes a System Processor that is connected to each of the configuration. The system processor at the CP, among other things, provides initialization and configuration services to the chip. The CP may be located in any of three locations: in the interface device chip; on the blade on which the chip is mounted or external to the blade. If external to the blade, the CP may be remote; that is, housed elsewhere and communicating by the network to which the interface device and CP are attached. The elements of a CP are shown in FIG. 17 and include memory elements (cache, flash and SDRAM), a memory controller, a PCI bus, and connectors for a backplane and for L1 network media.

Figure 18:
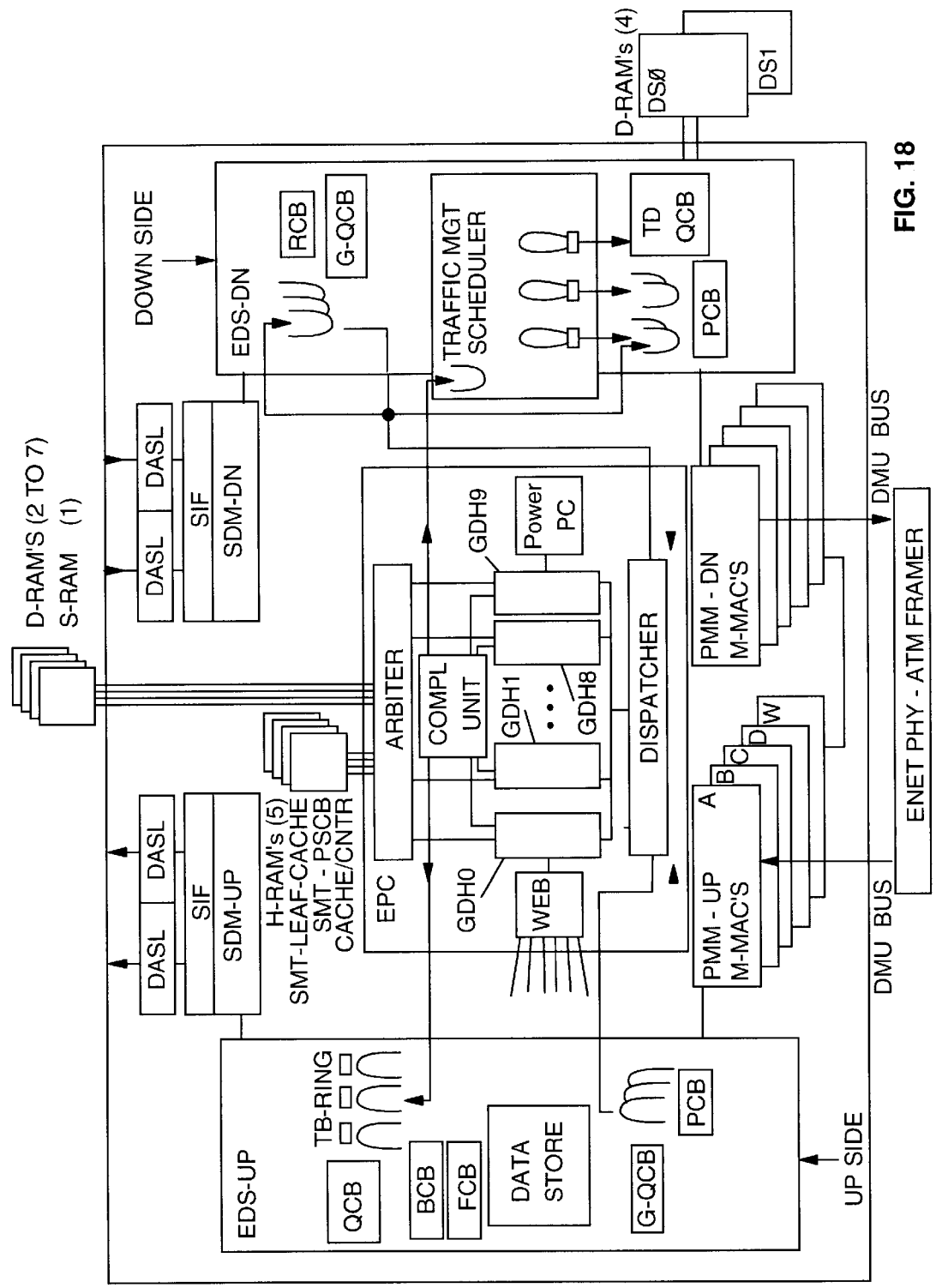
FIG. 18 shows a block diagram of the single chip Network Processor highlighting function in the EDS-UP, EDS DOWN and the EPC.

FIG. 18 shows the single chip Network Processor and the functions provided by the EDS-UP, the traffic Management (MGT) Scheduler and the EDS-DOWN (DN). The U-shaped icons represent queues and the Control Blocks (CB) that keeps track of the contents in the queues are represented by rectangular icons.

A description of the elements, their respective functions and interaction follows.

PMM: This is the part of the Network Processors that contains the MACs (FEnet, POS, GEnet) and attaches to the external PHY devices.

UP-PMM: This logic takes bytes from the PHYs, and formats it into FISH (16 bytes) to pass on to the UP-EDS. There are 4 DMUs within the PMM, each capable of working with 1 GEnet or 10 FEnet devices.

UP-EDS: This logic takes the fish from UP-PMM and stores them into the UP-Data Store (internal RAM). It is capable of working on 40 frames at once, and after the appropriate number of bytes are received, it will enqueue the frame to the EPC. When the EPC is finished with the frame, the UP-EDS will enqueue the frame into the appropriate Target Port Queue and start sending the frame to the UP-SDM. The UP-EDS is responsible for all buffer and frame management and returns the buffers/frames back to free pools when the transfer to UP-SDM is complete.

EPC: This logic contains the picoprocessors and (could) contain the embedded PowerPC. This logic is capable of looking at the frame header and deciding what to do with the frame (forward, modify, filter, etc.). The EPC has access to several lookup tables, and hardware assists to allow the picoprocessors to keep up with the high-bandwidth requirements of the Network Processor.

UP-SDM: This logic takes the frames, and formats them into PRIZMA cells for transmission to the switch fabric. This logic is also capable of inserting the VLAN header into the frame.

UP-SIF: This logic contains the UP-DASL macros and attaches to the external switch I/Os.

DN-SIF: This logic contains the DN-DASL macros and receives PRIZMA cells from the external I/Os.

DN-SDM: This logic receives the PRIZMA cells and preprocesses them for help in frame reassembly.

DN-EDS: This logic takes each cell and assembles them back into frames. The cell is stored into external Data Store, and buffers are linked together to make frames. When the entire frame is received, the frame will be enqueued to the EPC. After EPC is finished with the frame, it is enqueued to the Scheduler (if present) or the Target Port Queues. DN-EDS then sends the frames to the appropriate port by sending the frame, any alteration information, and some control information to the DN-PMM.

DN-PMM: Takes the information from DN-EDS and formats the frame into Ethernet, POS, etc. and sends the frame to the external PHY.

SPM: This logic is used to allow the Network Processor to interface to external devices (PHYs, LEDs, FLASH, etc) but only requires 3 I/Os. The Network Processor uses a serial interface to communicate to SPM and then SPM preforms the necessary functions to manage these external devices.

UP-SIDE Flow
1) Frame arrive at PHY
2) Bytes are received by UP-PMM
3) UP-PMM sends FISH over to UP-EDS (Fish means a portion of a frame)
4) UP-EDS stores FISH into UP-DS
5) UP-EDS sends header over to EPC
6) EPC processes header and sends enqueue information back to UP-EDS
7) UP-EDS continues to receive the remainder of frame from UP-PMM
8) UP-EDS sends information to UP-SDM when appropriate data is ready to send to switch
9) UP-SDM reads frame data and formats it into PRIZMA cells
10) UP-SDM sends cells to UP-SIF
11) UP-SIF transfers the cells over the DASL serial links to PRIZMA
12) UP-EDS frees up buffers/frames when all the data has been taken DN-SIDE Flow
1) DN-SIF receives PRIZMA cells
2) DN-SDM stores cells and preprocesses them for reassembly information
3) DN-EDS receives the cell data and reassembly information and links the cell into a new frame on down side
4) DN-EDS stores the cell into DN-DS
5) DN-EDS enqueues the frame to EPC when all of the data have been received
6) EPC processes the header and sends enqueue information back to DN-EDS
7) DN-EDS enqueues the frame into a scheduler queue (if present) or a Target Port Queue
8) DN-EDS services the queues and sends frame information into the PCB
9) DN-EDS uses the PCB to "unravel" the frame and reads the appropriate data and sends that data to DN-PMM
10) DN-PMM formats the data (with alteration if requested) and sends the frame to the external PHY
11) DN-PMM informs DN-EDS when buffers are no longer needed and DN-EDS frees these resources FRAME Control Flow
1) Header is sent to EPC from UP-DS or DN-DS
2) EPC looks up header information in lookup tables and receives frame enqueue information
3) EPC sends the enqueue information back to the EDS and the frame is enqueued to the appropriate queue
4) Cell Headers and Frame Headers are sent along with the frame data to aid in reassembly and frame forwarding CP Control Flow
1) Control Point formats a Guided Frame and sends it to the Network Processor
2) The Network Processor enqueues the Guided Frame to the GCH picoprocessor
3) The GCH processes the Guided Frame and reads or writes the requested areas of Rainier
4) The GCH passes any Table update requests over to the GTH
5) The GTH updates the appropriate table with information from Guided Frame
6) An acknowledgement Guided Frame is sent back to CP Network Processor Control Flow
1) A Picoprocessor can build a Guided Frame to send information to another Rainier or the Control Point
2) The Guided Frame is sent to the appropriate location for processing A single Interface device provides media speed switching for up to 40 Fast Ethernet Ports (FIG. 2A). 80 Fast Ethernet Ports are supported when two Interface devices are interconnected using IBM's Data Aligned Synchronous Link (DASL) technology (FIG. 2B). Each DASL differential pair carries 440 Mbps of data. Two sets of eight pairs provide a 3.5 Gbps duplex connection (8 times 440 Mbps in each direction). As shown in FIGS. 2C and 2D, larger systems can be built by interconnecting multiple Interface devices to a switch such as IBM's Prizma-E switch. The Interface device provides two of the 3.5 Gbps duplex DASL connections, one primary and one secondary, which can be used to provide a wrap-backpath for local frame traffic (when two Interface devices are directly connected, FIG. 2B) or a connection to a redundant switch fabric (FIG. 2D, Backup Sw.). In view of the above, the single Network Processor Chip is scaleable in that one chip can be used to provide a low end system (having relatively low port density—say 40) to high end system (having relatively high port density, say 80–n ports).

One Interface device in the system is connected to the system processor via one of up to ten 10/100 Mbps Fast Ethernet ports or a single 1000 Mbps Ethernet port. The Ethernet configuration to the system processor is placed in an EEPROM attached to the Interface device and loaded during initialization. The system processor communicates with all Interface devices in a system (see FIG. 2) by building special Guided Frames encapsulated, for example, as ethernet frames or other media interfaces. The encapsulated Guided Frames are forwarded across the DASL link to other devices allowing all of the Interface devices in the system to be controlled from a single point.

Guided Frames are used to communicate control information between the Control Point (CP) and the Embedded Processor Complex and within the interface device. A prior disclosure of Guided Cells which will elucidate the discussion here is found in U.S. Pat. No. 5,724,348 issued 3 Mar. 1998 for Efficient Hardware/Software Interface for a Data Switch" mentioned hereinabove and incorporated hereinto by reference.

For Guided Frame traffic that originates at the CP, the CP constructs the Guided Frame in data buffers in its local memory. The CP's Device Driver sends the Guided Frame to one of the media interfaces of the NetworkProcessor. Media Access Control (MAC) hardware recovers the Guided Frame and stores it in its internal data store (U_DS) memory. The Guided Frame is routed to the appropriate blade, processed, and routed back to the CP as required. Guided Frames passing between an external CP and the interface device are encapsulated to adapt to the protocol of the external network. As a consequence, if the external network includes ethernet, the Guided Frames are encapsulated as ethernet frames and so forth.

Ethernet encapsulation provides a means of transport for Guided Traffic between the CP and the Interface device. The Ethernet MAC (Enet MAC) of the Interface device does not analyze the Destination Address (DA) or Source Address (SA) when receiving frames. This analysis is performed by the EPC picocode. Guided Traffic presumes that the Interface device has not been configured and the DA and SA cannot be analysed by the EPC picocode. Therefore, these frames are inherently self-routing. The Enet MAC does, however, analyse the Ethernet Type field to distinguish Guided Traffic from Data Traffic. The value of this Ethernet Type value of the Guided Frame must match the value loaded into the E_Type_C Register. This register is loaded from Flash Memory by the Interface device's boot picocode.

The CP constructs the Guided Frame in data buffers in its local memory. The contents of a 32 bit register in the CP processor are stored in big endian format in the local memory as shown in FIG. 3. Having constructed the Guided Frame, the CP'S Device Driver sends an Ethernet frame containing a DA for specific Guided Cell Handler (GCH), an SA corresponding to the global MAC address for the CP or the MAC address for specific interface, a special Ethernet Type field that indicates a Guided Frame, and the Guided Frame Data. All Ethernet frames arriving on the port are received and analyzed by Enet MAC. For frames with an Ethernet Type value matching the contents of the E_Type_C Register, the Enet MAC strips off the DA, SA and Ethernet Type fields and stores the Guided Frame data into the U_DS memory. Bytes are collected by the Enet MAC one at a time into a block of 16 bytes called a Fish. These bytes are stored in big endian format with the first byte of the Guided Frame stored in the most significant byte location of the Fish (Byte 0). Succeeding bytes are stored in successive byte locations within the Fish (Byte 1, Byte 2, . . . , Byte 15). These 16 bytes are then stored in a Buffer in the U_DS beginning at the Fish 0 location. Succeeding Fishes are stored in successive Fish locations within the Buffer (Fish 1, Fish 2, Fish 3, etc.). Additional Buffers are obtained from a free pool as required to store the remainder of the Guided Frame.

The flow of guided traffic within the interface device 10 is shown in FIG. 4. The Enet MAC function of the Interface device examines the frame header information and determines that the frame is a Guided Frame. The Enet MAC removes the frame header from the Guided Frame and buffers the remainder of its contents in Interface device's internal U_DS memory. The Enet MAC indicates that the frame is to be enqueued to the General Control (GC) Queue for processing by the GCH. When the end of the Guided Frame has been reached, the Enqueue, Dequeue, and Schedule (EDS) logic enqueues the frame into the GC Queue.

The GCH picocode on the blade locally attached to the CP examines the Frame Control Information (see FIG. 6) to determine whether the Guided Frame is intended for other blades in the system and whether the Guided Frame is to be executed on the down side of the Interface device. If the frame is intended for blades other than or in addition to the locally attached blade, the GCH picocode updates the TB value in the Frame Control Block (FCB) with the TB value from the Guided Frame's Frame Control information and instructs the EDS to enqueue the frame in the multicast Target Blade Start of Frame (TB_SOF) Queue. For performance reasons, all Guided Traffic is enqueued to the multicast TB_SOF queue independent of the number of destination blades indicated.

If the frame is intended for only the locally attached blade, the GCH picocode examines the up/down field of the Frame Control information to determine whether the Guided Frame is to be executed on the up or down side of the Interface device (see FIG. 6). If the Guided Frame is to be executed on the down side of the Interface device, the GCH picocode updates the TB value in the FCB with the TB value from the Guided Frame's Frame Control information and instructs the EDS to enqueue the frame in the multicast Target Blade Start of Frame (TB_SOF) Queue. If the Frame Control information indicates that the Guided Frame is to be executed on the up side, the GCH picocode analyzes the Guided Frame and performs the operations indicated by the Guided Commands it contains.

Prior to processing of Guided Commands, the picocode checks the value of the ack/$\overline{noack}$ field of the Frame Control information. If this value is '0'b, then the Guided Frame is discarded following processing. Guided read commands shall not be of this category.

If the value of the ack/$\overline{noack}$ field is '1'b, and the value of the early/late field is '1'b, then prior to processing any of the Guided Commands in the Guided Frame, the picocode constructs an Early Ack Guided Frame with the value of the TB field of the Frame Control equal to the contents of the Early_Ack Guided Frame with the value of the TB field of the Frame Control equal to the contents of the My_TB Register. The picocode routes the Early Ack Guided Frame back to the CP by updating the TB value in the frame's FCB with the value contained in the TB field of the LAN Control Point Address (LAN_CP_Addr) Register and instructing the EDS to enqueue the frame in the multicast TB_SOF Queue. The picocode then processes the Guided Commands of the Guided Frame and discards the Guided Frame. Guided read commands shall not be of this category.

If, on the other hand, the value of the ack/$\overline{noack}$ field is '1'b and the value of the early/late field is '0'b, the picocode changes the resp/$\overline{req}$ field of the Frame Control information to '1'b to indicate a Guided Frame response, replaces the TB field with the contents of the My_TB Register, and processes each Guided Command within the Guided Frame. During the course of processing a Guided Command, the picocode updates the Completion Code field of the next Guided Command with the completion status code value for the current Guided Command. The picocode routes the response back to the source by updating the TB value in the (FCB) with the value corresponding to the Source Blade (LAN_CP_Addr Register value for CP) and instructing the EDS to enqueue the frame in the multicast TB_SOF Queue.

Frames residing in the TB_SOF Queue are scheduled for forwarding by the EDS. The Switch Data Mover (SDM) builds the switching fabric Cell Header and Interface device Frame Header from the information contained in the FCB. These cells pass through the switching fabric device and arrive at the target blade where the cells are reassembled into a frame in the D-DS memory. The SDM of the down side recognizes that the frame is a Guided Frame and signals the EDS to enqueue it in the GC Queue.

Pressure from the GC Queue or the GT Queue stimulates the picocode to access and analyse the Guided Frames. All Guided Frames arriving on the down side are initially enqueued in the GC Queue. The gth/$\overline{gch}$ value of the Frame Control Information for these frames is examined by GCH picocode. If the gch/$\overline{gth}$ value is '0'b, the Guided Frame is enqueued in the GT Queue. Otherwise, the GCH picocode examines the resp/$\overline{req}$ field of the Frame Control information to determine if the Guided Frame has already been executed. If the resp/$\overline{req}$ has a value of '1'b, then the Guided Frame has already been executed and is routed to the CP. Target port values corresponding to CP connections are maintained by EPC picocode. Frames from these Target Port queues are transmitted from the Interface device back to the CP.

If the resp/$\overline{req}$ field has a value of '0'b, then the blade may be local or remote with respect to the CP. This is resolved by comparing the value of the TB field of the LAN_CP_Addr Register with the contents of the My Target Blade (My_TB) Register. If they match, then the blade is local to the CP, otherwise, the blade is remote form the CP. In either case, the picocode examines the up/$\overline{down}$ value of the Frame Control Information. If up/$\overline{down}$ is equal to '1'b, then the frame is enqueued in the Wrap TP queue for forwarding to the U_DS and processing by the GCH on the up side. Otherwise, the picocode (GCH or Gth) performs the operations indicted by the Guided Commands contained in the Guided Frame. Prior to processing of the Guided Commands, the picocode checks the value of the ack/$\overline{noack}$ field of the Frame Control information. If this value is '0'b, then the Guided Frame is discarded following processing. Guided read commands shall not be of this category.

If the value of the ack/$\overline{noack}$ field is '1'b and the value of the early/late field is '1'b, then prior to processing any of the Guided Commands in the Guided Frame, the picocode constructs an Early Ack Guided Frame with the value of the TB field of the Frame Control information equal to the contents of the My_TB Register. If the bade is remote from the CP, the picocode routes the Early Ack Guided Frame to the Wrap Port. Otherwise, the blade is local to the CP and the frame is routed to the Port Queue corresponding to the CP. The picocode processes the Guided Commands while either the Wrap Port moves the Early Ack Guided Frame from the D_DS to the U_DS and enqueues the frame in the GC Queue on the up side or the frame is transmitted from the Port Queue back to the CP. For frames wrapped back to the U_DS, the GCH picocode again sees this frame, but the res/req field will have a value of '1'b. The GCH picocode routes the frame back to the CP by updating the TB field in the FCB with the value contained in the TB field of the LAN_CP_Addr Register and instructing the EDS to enqueue the frame in the multicast TB_SOF Queue. Frames residing in the TB_SOF Queue are scheduled for forwarding by the EDS. The SDM builds the Prizma Cell Header and Interface device Frame header from information contained in the FCB. Cells from this frame pass through Prizma and are reassembled into a frame on the CP's local blade. The SDM of the down side recognizes that the frame is a Guided Frame and signals the EDS to enqueue it in the GC Queue. This time when the GCH picocode analyzes the frame, the resp/$\overline{reg}$ field has a value of '1'b. This implies that this blade is locally attached to the CP and the Guided Frame is routed to the Port Queue corresponding to the CP. Frames from this queue are transmitted from Interface device back to the CP.

If, on the other hand, the value of the ack/$\overline{noack}$ field is '1'b and the value of the early/late field is '0b, the picocode changes the resp/req field to '1'b to indicate a Guided Frame response, replaces the TB field with the contents of the My_TB Register, and then processes each Guided Command within the Guided Frame. During the course of processing a Guided Command, the picocode updates the Completion Code field of the next Guided Command with the completion status code value for the current Guided Command. If the blade is remote from the CP, then the picocode routes the Guided Frame to the Wrap Port. Otherwise, the blade is local to the CP and the frame is routed to the Port Queue corresponding to the CP. Either the Wrap Port moves the Guided Frame from the D_DS to the U_DS and enqueues the frame in the GC Queue on the up side or the frame is transmitted form the Port Queue back to the CP. For frames wrapped back to the U_DS, the GCH picocode again sees this frame, but the resp/$\overline{req}$ field will have a value of 1'b. The GCH picocode routes the frame back to the CP by updating the TB field in the FCB with the value contained in the TB field of the LAN_CP_Addr Register and instructing the EDS to enqueue the frame in the multicast TB_SOF Queue. Frames residing in the TB_SOF Queue are scheduled for forwarding by the EDS. The SDM builds the Prizma Cell Header and Interface device Frame header from information contained in the FCB. Cells from this frame pass through Prizma and are reassembled into a frame on the down side of the CP's local blade. The SDM of the down side recognizes that the frame is a Guided Frame and signals the EDS to enqueue it in the GC Queue. This time when the GCH picocode analyzes the frame from the D_DS, the resp/$\overline{req}$ field has a value of '1'b. This implies that this blade is locally attached to the CP and the Guided Frame is routed to the Port Queue corresponding to the CP. Frames from this queue are transmitted from Interface device back to the CP.

If, for any reason, the GCH picocode encounters a Guided Frame with the TB field of the Frame Control information equal to '0000'h, then the GCH picocode interprets the frame as intended for only this blade and act accordingly. This action is required during initialization when the value of the My_TB Register is '0000'h for all blades. The CP will initialize the My_TB Register of the locally attached blade by sending Write Guided Command in a Guided Frame whose Frame Control Information has a TB value of '0000'h.

Any of the picoprocessors within the EPC can generate a Guided Frame. This frame can be the Unsolicited Guided Frame or any other form of Guided Frame. Internally generated frames of this type are constructed in a way that does not allow acknowledgment (i.e. ack/$\overline{noack}$='0'b). These frames may be sent to one of the two picoprocessors (GCH or GTH) within the same EPC or to the GCH or GTH of some other blade.

Unsolicited Guided Frames may also be sent to the CP. Guided Frames destined for the same EPC are constructed using data buffers in the D_DS. These frames are then enqueued in the GC or GT Queue for processing. These frames are then processed and discarded in the usual manner. Unsolicited Guided Frames destined for the locally attached CP are constructed using data buffers in the D_DS. These frames are constructed in a way that indicates that they have been executed by the EPC (i.e. resp/$\overline{req}$='1'b, and TB=My_TB). These frames are enqueued in the Port Queue corresponding to the CP. Frames from this queue are transmitted back to the CP.

Guided Frames destined for another blade can be constructed using data buffers in the D_DS or the U_DS. Unsolicited Guided Frames destined for the CP are constructed in a way that indicates that they have been executed by the EPC (i.e. resp/$\overline{req}$='1'b, and TB=My_TB). Frames constructed using buffers from the D_DS are enqueued to the Wrap Port. These frames are moved to the U_DS and enqueued to the GC Queue on the up side. Unsolicited Guided Frames with a resp/req value of '1'b will be routed to the CP using TB value in the LAN_CP_Addr Register. Otherwise, the GCH picocode routes these frames using the TB value of the Frame Control Information of the Guided Frame. At the receiving blade, the frame is enqueued to the GC Queue of the down side. The GCH of this blade executes and discard the frame (resp/$\overline{req}$='0'b and gth/$\overline{gch}$='1'), or enqueues the frame to the GT Queue (resp/$\overline{req}$='0'b and gth/$\overline{gch}$='0'), or enqueues the frame to the Port Queue corresponding to the CP (resp/$\overline{req}$='1'b). Frames constructed using data buffers in the U_DS are enqueued directly into the GC Queue of the up side. From this point forward, these frames follow the same route and are handled in the same way as those constructed using D_DS data Buffers. FIG. 5 shows the generalized format for guided frames.

The format shown is a logical representation with the most significant byte on the left and the least significant byte on the right. Four byte words begin with word 0 at the top and increase towards the bottom of the page.

Since Guided Frames must be routed and processed before the interface device has been configured by the CP, these frames must be self-routing. The results normally obtained by look-up and classification are contained in this Frame Control information field of the Guided Frame allowing the chip to update the FCB with this information without performing a look-up operation. The target blade information contained in the Guided Frame is used by the Guided Frame Handler to prepare the Leaf Page field of the FCB. The CP provides the Target Blade information while the GCH picocode fills in the other fields in the FCB. This FCB information is used by the SDM to prepare the Cell and Frame headers. The format of the Frame Control information field of the Guided Frame is shown in FIG. 6.

An explanation for the abbreviation at each bit position in FIG. 6 follows:

| | |
|---|---|
| resp/$\overline{req}$ | Response and Not Request indicator value. This field is used to differentiate between request (unprocessed) and response Guided Frames. |
| | 0      request |
| | 1      response |
| ack/$\overline{noack}$ | Acknowledgment or No Acknowledgment control value. This field is use to control whether (ack) or not (noack) the GCH picocode acknowledges the Guided Frame. Guided Frames that are not to be acknowledged shall not contain any form of Guided Command that performs a read. |
| | 0      No Acknowledgment |
| | 1      Acknowledgment |

-continued

| | |
|---|---|
| early/late | Early and Late Acknowledgment control value. This field is used to control whether the acknowledgment requested (ack/noack = '1'b) occurs before (early) or after (late) the Guided Frame has been processed. This field is ignored when ack/noack = '0'b.<br>0    Acknowledge after Guided Frame processing<br>1    Acknowledge before Guided Frame processing |
| neg/all | Negative Acknowledgment or Acknowledge All control value. This field is ignored when the ack/noak field has a value of '0'b unless a guided command does not complete successfully.<br>0    Acknowledge all Guided Frames if ack/noack = '1'b. Early or Late Acknowledgment determined by value of early/late.<br>1    Acknowledge only Guided Frames that do not complete successfully. This acknowledgment will occur independent of the values of ack/noak and early/late and will of course be a late acknowledgment. |
| up/down | Up or Down control value. This value is used to control whether the frame is processed on the up side or the down side. This field is ignored when resp/req is '1'b. All multicast Guided Frames shall have an up/down value of '0'b. In addition, Guided Commands that require the use of GTH hardware assist instructions shall have an up/down value of '0'b.<br>0    Down side processing<br>1    Up side processing |
| gth/gch | General Tree Handler or Guided Cell Handler control value. This value is used to direct Guided Frames to the proper picoprocessor.<br>0    GCH picoprocessor<br>1    GTH picoprocessor |
| TB | Target Blade value. When resp/req is '0'b, this field contains routing information used by Prizma. Each bit position corresponds to a Target Blade. If this value is '0000'h, then the Guided Frame is assumed to be for this blade and is executed accordingly. A value of '1'b in one or more bit positions of the TB field indicates that the cell is routed to the corresponding Target Blade(s). When resp/req is '1'b, the field contains the My_TB value of the responding blade. |

Word 1 of the Guided Frame contains a correlator value (FIG. 7). This value is assigned by the CP software to correlate Guided Frame responses with their requests. The correlator includes a plurality of bits with assigned functions.

Every Guided Command begins with a Command Control Information field. This Command Control contains information that aids the GCH picocode in processing a Guided Frame. The format for this information is shown in FIG. 8.

Length value: This value indicates the total number of 32 bit words contained in the Control Information (Cmd Word 0), The Address Information (Cmd Word 1), and Operand (Cmd Words 2+) portions of the Guided Frame.

Completion Code value: This field is initialized by the CP and is modified by the GCH picocode when processing Guided Commands. The GCH picocode uses this field for completion status for the preceding Guided Command in the command list. Since all Guided Command lists terminate with the End Delimiter Guided Command, the completion status of the last command is contained in the End Delimiter's Completion Code field.

Guided Command type value (Symbolic Name)

| Symbolic Name | Type Value | Type Description |
|---|---|---|
| End_Delimiter | 0000 | mark the end of a Guided Frame sequence |
| Build_TSE_Free_List | 0001 | build a free list. |
| Software_Action | 0010 | execute software action |
| Unsolicited | 0011 | frames initiated by the EPC picocode |
| Block_Write | 0100 | write a block of data to consecutive addresses |

-continued

Guided Command type value (Symbolic Name)

| Symbolic Name | Type Value | Type Description |
|---|---|---|
| Duplicate_Write | 0101 | write duplicate data to registers or memory. |
| Read | 0110 | request and respond for reading register or memory data |
| | 0111 | reserved |
| Insert_Leaf | 1000 | insert a leaf into the search tree. |
| Update_Leaf | 1001 | update a leaf of the search tree |
| Read_Leaf | 1010 | request and respond for reading of Leaf Page data |
| | 1011 | reserved |
| Delete_Leaf | 1100 | delete a leaf of the search tree |
| | 1101–1111 | reserved |

The addressing information contained in the Guided Frame identifies an element within the Networking Processor's addressing scheme. The general form for the Address Information field is shown in FIG. 9.

The Interface device employs a 32 bit addressing scheme. This addressing scheme assigns an address value to every accessible structure of the Interface device. These structures are either internal to the Processor or connected to interfaces under the control of the Processor. Some of these structures are accessed by the Embedded Processor Complex (EPC) via an internal interface called the Web Interface. The remainder of the structures are accessed via memory controller interfaces. In all cases the general form of the address is shown in FIG. 10.

The Network Controller is subdivided into major chip islands. Each island is given a unique Island ID value. This 5 bit Island ID value forms the 5 most significant bits of the address for structures controlled by that chip island. The correspondence between encoded Island ID value and the chip island name is shown in FIG. 11. The second portion of the Web address consists of the next most significant 23 bits. This address field is segmented into a structure address portion and an element address portion. The number of bits used for each segment may vary from island to island. Some islands may contain only a few large structures while others may contain many small structures. For that reason there is no fixed size for these address segments. The structure address portion is used to address an array within the island while the element address portion is used to address an element within the array. The remaining portion of the address is to accommodate the Web Interface's 32 bit data bus limitation. This 4 bit word address is used for selecting 32 bit segments of the addressed element. This is necessary for moving structure elements wider than 32 bits across the Network Controller's Web Data Bus. Word address value '0'h refers to the 32 most significant bits of the structure element while sequential word address values correspond to successively less significant segments of the structure element. The word address portion of the address is not required for structures not accessed via the Web Interface. For this reason, the Up Data Store, Control Memories, and Down Data Store make use of the entire 27 least significant bits of address to access structure elements. Another exception to this format is the address for the SPM Interface. In that case all 27 bits of address are used and no element is greater than 32 bits in width.

The Embedded Processing Complex (EPC) provides and controls the programmability of the Interface device Chip. It includes the following components (see also FIG. 12A):

N processing units, called GxH: The GxHs concurrently execute picocode that is stored in a common Instruction Memory. Each GxH consist of a Processing Unit core, called CLP, which contains a 3-stage pipeline, 16 GPRs and an ALU. Each GxH also contains several coprocessors, like for example the Tree Search Engine.

Instruction Memory: Is loaded during initialization and contain the pico-code for forwarding frames and managing the system.

A Dispatcher: Dequeues frame-addresses from the up and down dispatcher queues. After dequeue, the dispatcher prefetches part of the frame-header from the up or down DataStore (DS) and stores this in an internal memory. As soon as a GxH becomes idle, the Dispatcher passes the frame header with appropriate control information, like the Code Instruction Address (CIA) to the GxH. The dispatcher also handles timers and interrupts.

Figure 19:
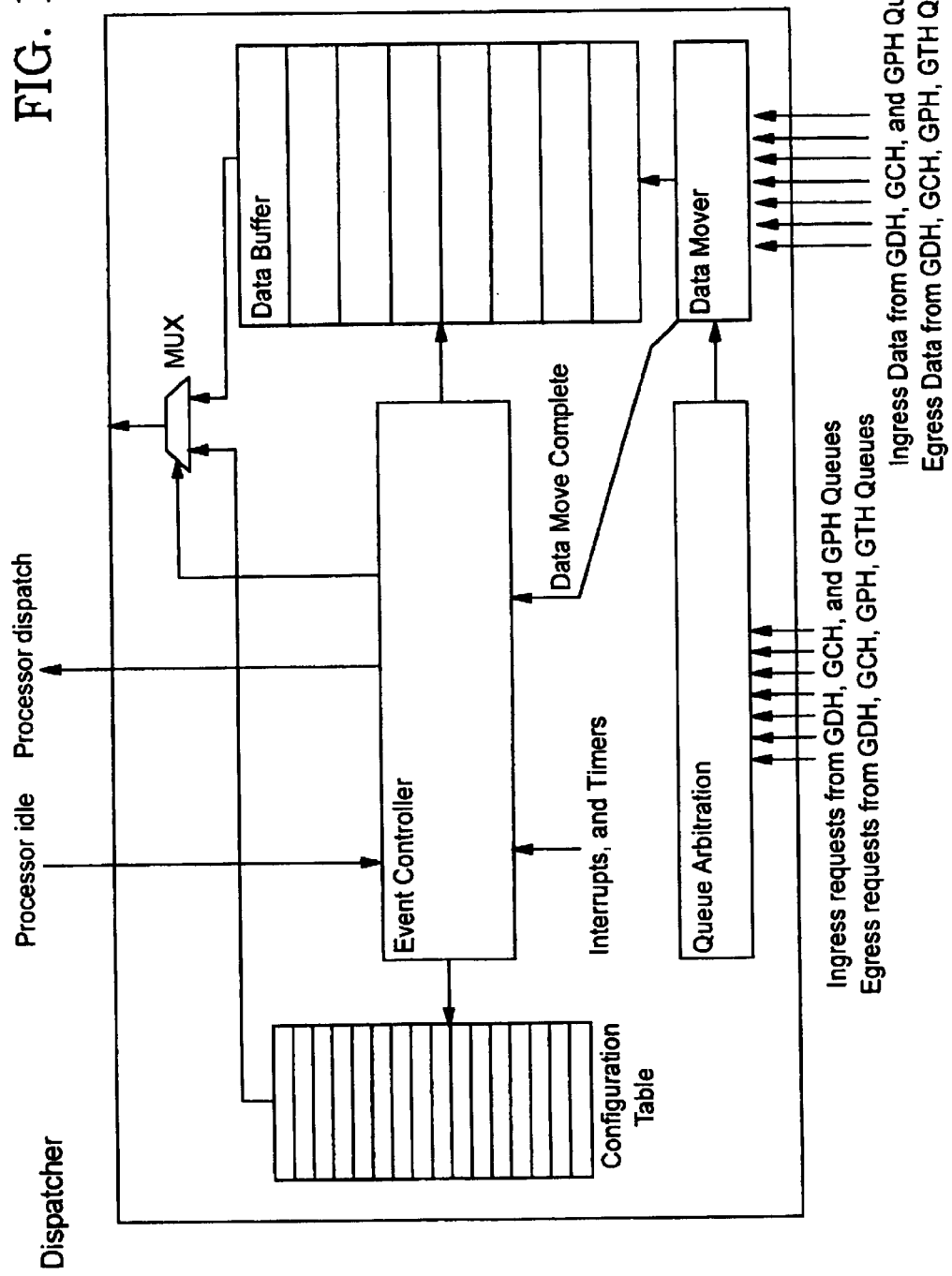
FIG. 19 shows a block diagram for the Dispatcher.

FIG. 19 shows a block diagram of the dispatcher that includes a configuration table, event controller, MUX, data buffer, Queue arbitration unit and data mover, all of which are operatively coupled as shown in the figure.

The EPC data prefetches are event driven by request from both the ingress and egress queues. These requests feed into the Queue Arbiter of the Dispatcher which will then determine which queue will be serviced. The queue arbiter will then inform the Data Mover to start the move. The Data Mover transfers the data between each of the unique interfaces to the Data Buffer which is the reservoir of frame headers to be dispatched to the processing units.

The Event Controller monitors the input events, Data Buffers available for dispatch, Interrupts and Timers. It also monitors the availability of the processing units. When a processing unit is available and it matches the requirements of the events that are available to be dispatched, it will dispatch the event to the processing unit. For a timer or interrupts event this will mean that information from the configuration table will be dispatched. For a data queue event both a configuration table entry and frame header and control information from the Data Buffer will be dispatched to the processing unit.

The Configuration Table contains a default information that is to be dispatched to the processing unit for each event: queue, timer, or interrupt. Some queues are further subdivided into entries by characteristics of the frame or the port in which it originated. An entry contains the starting instruction address for the processor, controls for the hardware classifier and a user defined area.

A Tree Search Memory (TSM) Arbiter: There are a number of shared internal and external memory locations available to each GxH. Since this memory is shared an arbiter is used to control access to the memory. The TSM can be accessed directly by the picocode, which can for example be used to store aging tables in the TSM. Also, the TSM will be accessed by the TSE during tree searches.

The Completion Unit (CU): The Completion Unit performs two functions. First, it interfaces the N Processing Units to the UP and Dn EDS (Enqueue, Dequeue and Schedule Island). The EDS performs the enqueue action: a frame address, together with appropriate parameters called the FCBPage, is queued in either a transmission queue, a discard queue, or a dispatcher queue. Second, the Completion Unit guarantees frame sequence. Since it may happen that multiple GxHs are processing frames that belong to same flow, precautions must be taken that these frames are enqueued in the up or dn transmission queues in the right order. The Completion Unit uses a label that is generated by the Classifier Hardware Assist upon frame dispatch.

Classifier Hardware Assist: For up-frames, the Classifier Hardware Assist provides a classification for well known cases of frame formats. Classification results are passed to the GxH, during frame dispatch, in terms of the CIA and contents of one or more registers. For dn-frames, the Classifier Hardware Assist determines the CIA, depending on the frame header. For both up and dn frame dispatches, the Classifier Hardware Assist generates a label that is used by the Completion Unit to maintain frame sequence.

Up and dn DataStore Interface and arbiter: Each GxH has access to the up and dn DataStore: read access is provided when reading "more Fish" and write access is provided when writing back the contents of the FishPool to the DataStore. Since there are N Processing Units, and only one of them at a time can access the up DataStore and one at a time can access the dn DataStore, one arbiter for each DataStore is required.

Figure 20:
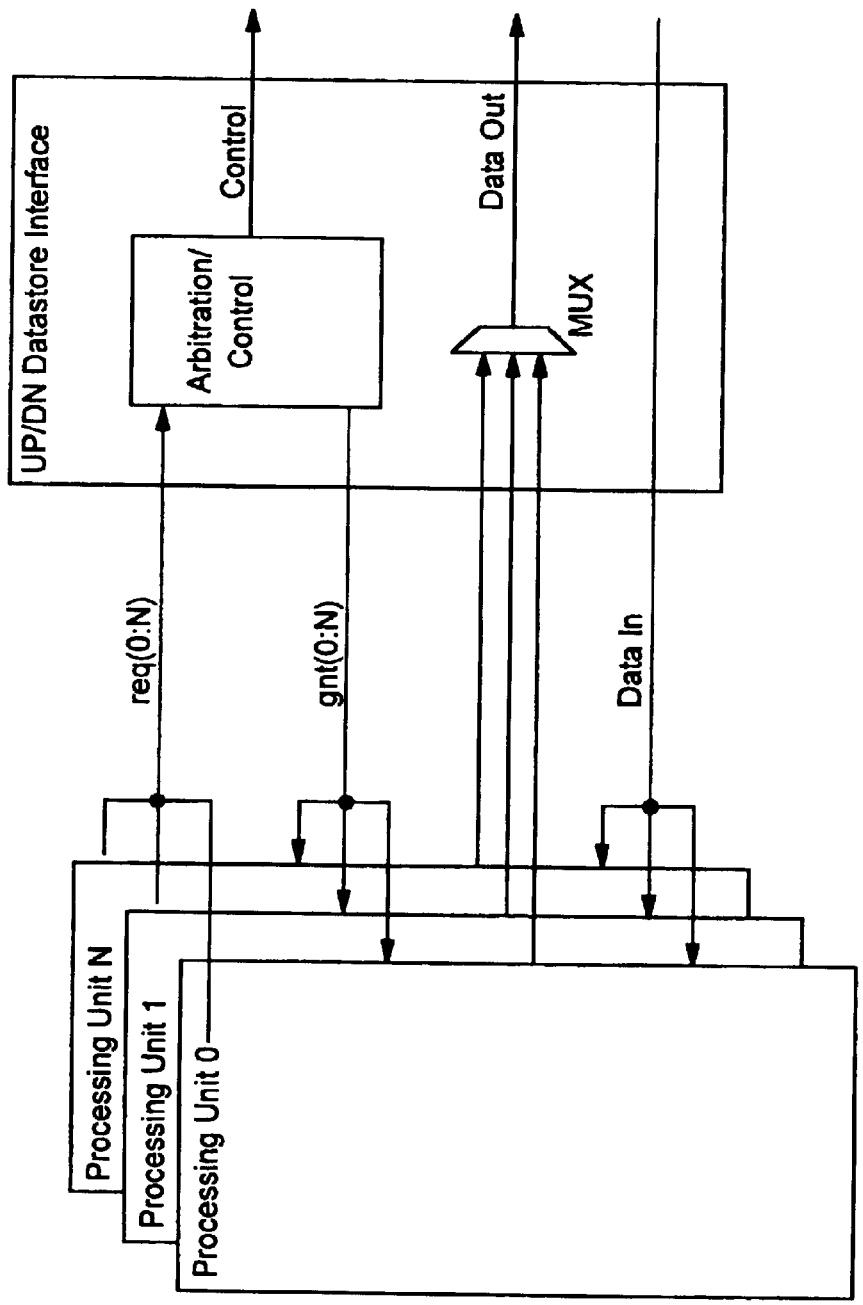
FIG. 20 shows a schematic of the Processors and Data Store Interface.

FIG. 20 shows a schematic of the N Processing Units and the UP Data Store Interface (UP DS i/f). A similar configuration is provided for the DOWN Data Store Interface (DN DS i/f). The schematic includes an Arbitration/Control Unit coupled by a request (req) line and grant (gnt) line to the N Processing Units. The Arbitration/Control Unit is also connected to a control line. A MUX is connected at its input to separate data line from each of the Processing Units. The output side of the MUX is connected to an output data line.

The UP/DN Datastore Interfaces provide the processing units a secondary read and a primary write access to the Network Processor Datastores. The main path that data is read from the data stores is through the Dispatcher in which the first 16 to 64 bytes of the frame are prefetched and passed to the processing unit. If the processing units need to read more data for further analysis it can access the data stores through either the UP or DN Datastore interfaces. In some instances a frame will need to be generated or data in the data stores modified. The UP/DN Datastore Interfaces provides this capability through a write path from the N processors to the two datastores.

The UP/DN Datastores arbitrate between the N processors and multiplex the control and data lines between the Network Processor Datastores and the N Processing Units.

WEB Arbiter and WEBWatch interface: The WEB Arbiter arbitrates among the GxHs for access to the WEB. All GxHs have access to the WEB which allows access to all memory and registers functions in an Interface device. This allows any GxH to modify or read all configuration areas. The WEB can be thought of as the Interface device memory map. The WEBWatch interface, provides access to the entire WEB from outside the chip using 3 chip. IOpins.

Debug, Interrupts and Single Step Control: The WEB allows the GCH or WEBWatch to control each GxH on the chip when necessary. For example, the WEB can be used by the GCH or WEBWatch to single step instructions on a GxH.

An embedded general purpose processor, like a PowerPC. There are four types of GxH (FIG. 12B):

GDH (General Data Handler). There are eight GDHs. Each GDH has a full CLP with the five coprocessors (which are described in the next section). The GDHs are mainly used for forwarding frames.

GCH (Guided Cell Handler). The GCH has exactly the same hardware as a GDH. However, a guided frame can only be processed by the GCH. It is programmable on the WEB (CLP_Ena register) if the GCH is enabled to also process dataframes (in which case it takes the role of a GDH). The GCH has additional hardware compared to the GDH: hardware assist to perform tree inserts and deletes. The GCH is used to execute guided-cell related picocode, perform chip and tree management related picocode like aging and to exchange control information with the CP and/or another GCH. When there is no such task to perform the GCH will execute frame forwarding related picocode, and in this case behaves exactly like a GDH.

GTH (General Tree Handler). The GTH has additional hardware assist to perform tree inserts, tree deletes and rope management. The GTH will process dataframes when there are no frames (containing tree management commands) in the GPQ.

GPH (General Power PC Handler). The GPH has additional hardware compared with the GDH and GTH. The GPH interfaces to the General Purpose Processor by means of the Mailbox interface (i/f).

The number of GxHs (ten) is a "best-guess". Performance evaluation will determine how much GxH are really required. The architecture and structure is completely scaleable towards more GxH and the only limitation is the amount of silicon area (which should then also include a larger arbiter and instruction memory).

Figure 12C:
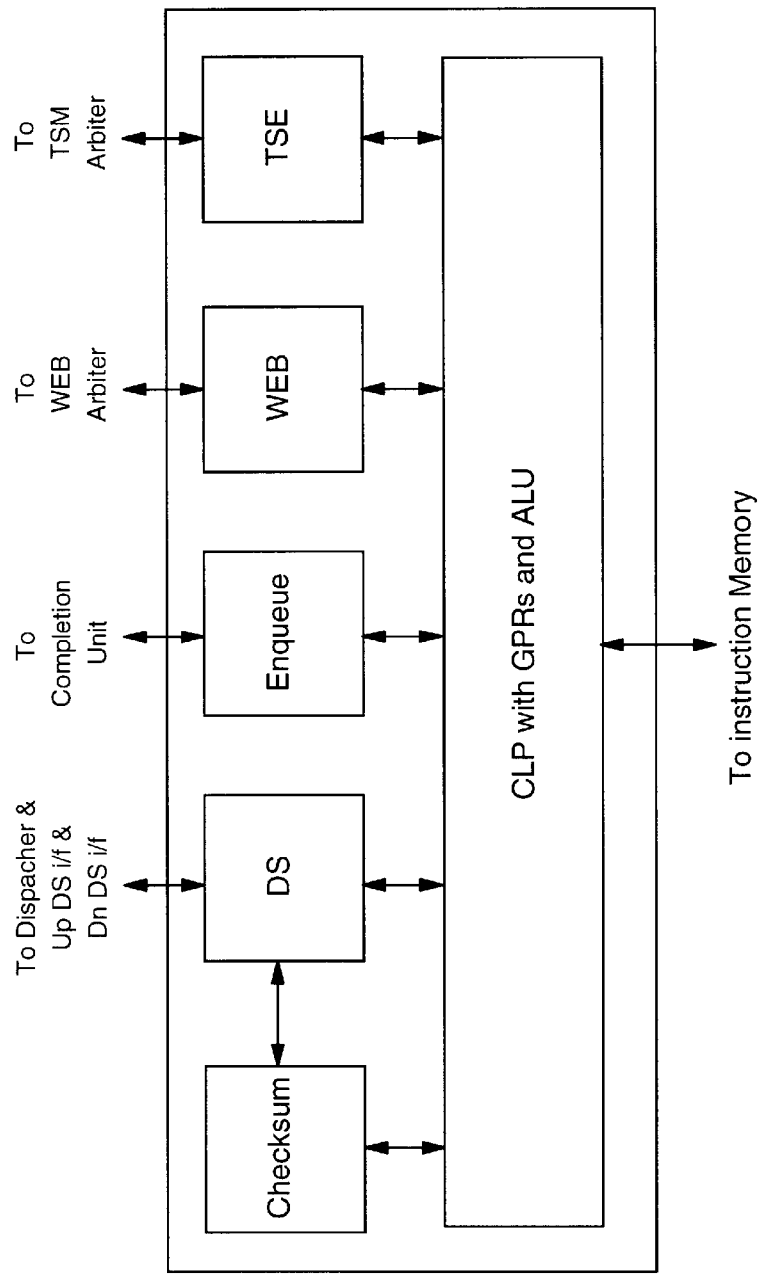
FIG. 12C shows a structure for a GxH Processor.

Each GxH is structured as shown in FIG. 12C. In addition to the CLP with General Purpose Registers (GPR) and Arithmetic Logic Unit (ALU), each GxH contains the following coprocessors:

(DS) Coprocessor Interface. Interfaces to the Dispatcher and to the sub-islands that provide read and write access to the up and dn DataStores. The DS Interface contains the so called FishPool.

The Tree Search Engine Coprocessor (TSE). The TSE performs searches in the trees, and also interfaces to the Tree Search Memory (TSM).

Enqueue Coprocessor. Interfaces the Completion Unit Interface and contains the FCBPage. This Coprocessor contains a 256-bit register with additional hardware assist that the picocode must use to build the FCBPage, which contain the enqueue parameters. Once the FCBPage is built, the picoprocessor can execute an enqueue instruction, which causes this coprocessor to forward the FCBPage to the Completion Unit.

WEB Interface Coprocessor. This coprocessor provides an interface to the WEB Arbiter and allows reading and writing to/from the Interface device WEB.

Checksum Coprocessor. Generates checksums on frames stored in the Fishpool (described hereinafter).

The Processing Units are shared between ingress processing and egress processing. It is programmable regarding how much bandwidth is reserved for ingress processing versus egress processing. In the current implementation, there are two modes: 50/50 (i.e. ingress and egress get the same bandwidth) or 66/34 (i.e. ingress gets twice as much bandwidth as egress).

Operation of the Processing Units is event-driven. That is, frame arrival is treated as an event, as well as popping of a timer or an interrupt. The dispatcher treats different events in an identical fashion, though there is a priority (first interrupt, then timer-events and finally frame arrival events). When an event is handed to a Processing Unit, appropriate information is given to the Processing Unit. For frame arrival events, this includes part of the frame header, and information coming from the hardware classifier. For timer and interrupts, this includes the code entry point and other information that relates to the event.

When a frame arrives on the ingress side, and the number of received bytes of this frame has exceeded a programmable threshold, the address of the frame-control-block is written in a GQ.

When a complete frame has been re-assembled on the egress side, the frame address is written in a GQ. There are four types of GQ's (and for each type, FIG. 12B, there is an ingress version and a egress version):

GCQ: contains frames that must be processed by the GCH.

GTQ: contains frames that must be processed by the GTH.

GPQ: contains frames that must be processed by the GPH.

GDQ: contains frames that can be processed by any GDH (or GCH/GTH when they are enabled to process dataframes). For the GDQ, there are multiple priorities, whereby frames enqueued in a higher priority GDQ will be processed before frames enqueued in a lower priority queue.

Some Processing Units may be specialized. In the current implementation, there are four types of Processing Units (GxH) (see also FIG. 12B):

GDH (General Data Handler). The GDHs are mainly used for forwarding frames.

GCH (Guided Cell Handler). The GCH has exactly the same hardware as GDH. However, a guided frame can only be processed by the GCH. It is programmable on the WEB (CLP_Ena register) if the GCH is enabled to also process dataframes (in which case it takes the role of a GDH).

GTH (General Tree Handler). The GTH has additional hardware compared to the GDH/GCH: hardware assist to perform tree inserts, tree deletes and rope management. The GTH will process dataframes when there are no frames (containing tree management commands) in the GPQ.

GPH (General PowerPC Handler). The GPH has additional hardware compared to the GDH/GTH. The GPH interfaces to the embedded PowerPC by means of a mailbox interface.

In an actual implementation, the role of GCH, GTH and GPH can be implemented on a single Processing Unit. For example one implementation could have one Processing Unit for GCH and GPH. A similar comment holds for the GCQ, GTQ and GPQ.

The purpose of the Datastore Coprocessor is:

To interface to the Up DataStore, which contains frames that have been received from the media, and the Down DataStore, which contains reassembled frames received from the Prizma Atlantic. Switch system.

The Datastore Coprocessor also receives configuration information during the dispatch of a timer event or interrupt.

The Datastore Coprocessor is able to calculate checksums on frames.

The Datastore Coprocessor contains a FishPool (that can hold 8 fish), a Scratch Memory (that can hold 8 fish) and some control registers to read/write FishPool contents from/ to the up or down datastore. The FishPool can be seen as some kind of work area for the Datastore: instead of reading/ writing directly to a Datastore, a larger amount of frame data is read from the Datastore into the Fishpool or a larger amount of data is written from the Fishpool into the Datastore. The unit of transfer is a Fish, which equals 16 Bytes.

The Fishpool can be seen as a memory that can contain 8 fish, that is 8 words of 128 bit each. In the CLP processor architecture, the Fishpool is a register array of 128 bytes. Each byte in the Fishpool has a 7-bit byte address (0 . . . 127) and access is on a 16-bit or 32-bit basis. Like all register arrays, the Fishpool has a circular addressing scheme. That is, addressing a word (i.e. four bytes) starting at location 126 in the Fishpool returns bytes 126, 127, 0 and 1. Furthermore, from a Datastore Coprocessor point of view, fish-locations in the Fishpool have a 3-bit fish-address.

Upon frame dispatch the first N fish of a frame are automatically copied in the Fishpool by the Dispatcher. The value of N is programmable in the PortConfigMemory. Typically, N equals four for up frame dispatch, 2 for dn unicast frame dispatch, 4 for dn multicast frame dispatch and 0 for interrupts and timers.

The picocode can read more bytes from a frame, in which case the Datastore Coprocessor automatically reads the frame data into the fishpool at the next fish address, wrapping automatically to 0 when the boundary of the Fishpool has been reached. Also, the picocode can read or write the up/down datastore at an absolute address.

The WEB Coprocessor interfaces to the EPC WEB Arbiter. The EPC WEB Arbiter Arbitrates among the ten GxH and the WEB Watch to become a master on the Interface device WEB interface. This allows all GxH to read and write on the WEB.

The interface device memory complex provides storage facilities for the Embedded Processing Complex (EPC) FIG. 12A. The memory complex includes the Tree-Search Memory (TSM) Arbiter and a plurality of on-chip and off-chip memories. The memories store tree structures, counters and anything else that the pico code requires memory access for. Furthermore, the memories are used to store data structures that are used by the hardware, like free lists, queue-control-blocks, etc. Any memory location which is not allocated for trees or which is not allocated for trees or which is not used by the hardware is by default available for pico code use, like counters and aging tables.

FIG. 13 shows a more detailed block diagram of the memory complex. The tree-search memory (TSM) arbiter provides the communication link between the Embedded Processors (GxH) and the memories. The memories include 5 on-chip SRAMs, 1 off-chip SRAM, and 7 off-chip DRAMS. The TSM Arbiter includes ten Request Control Units (each one connected to one of the Embedded Processor GxH) and 13 memory arbiter units, one for each memory. A bus structure interconnects the Request Control Units and the arbiter units in such a way that each control unit and its connected GxH have access to all memories.

The control unit includes necessary hardware to steer data between the Embedded Processor (GxH) and the arbiters.

The SRAM arbiter units, among other things, manage the flow of data between the Embedded Processor GxH and the on-chip and off-chip SRAMs.

The DRAM Arbiter Units, among other things, manages the flow of data between the Embedded Processor (GxH) and the off-chip DRAM devices.

Each Memory Arbiter contains a "back-door" access, which is typically used by other parts of the chip and has highest access priority.

The DRAM Memories can run in two modes of operation:
TDM-mode. Memory access to the four banks in the DDRAM is done alternating read-"windows" and write-windows, whereby in a read window, access to any of the four banks is read-only and in a write window, access to any of the four banks is write only. Using TDM-mode for multiple DDRAMs allows to sharing some control signals between the DDRAMs and hence this saves some chip IOs (which is a very scarce resource).

Non-TDM-mode. Memory access to the four banks in the DDRAM can be a combination of read and write (e.g., one can do a read in bank A and a write in bank C within an access window).

The TSM Arbiter Allows
N Requesters simultaneous access to M memories. When multiple Requesters want to access the same memory, a round-robin arbitration is performed.

The M memories can have different properties. In our current implementation, there are three memory types: internal SRAM, external SRAM and external DDRAM.

The M memories and N Requesters are homogeneous: any Requester can access any memory.

Some memories are logically divided into multiple sub-memories (like four banks in the DDRAM), which can be logically accessed simultaneously.

Part of the M memories are used for control memories containing internally used data structures, which have a high priority access compared to the picoprocessors. This also allows debugging of the chip, since the picoprocessors can read the contents of the control memories.

The arbiter supports read access, write access and read-add-write, whereby an N-bit integer is added to the contents of the memory in an atomic operation.

A general address scheme is used to access the M memories, such that the physical location of an object in the memory is transparent.

The concept of trees as used by the Tree Search Engine to store and retrieve information. Retrieval, i.e., tree-searches and also inserts and deletes are done based on a Key, which is a bit-pattern like, for example, a MAC source address, or the concatenation of an IP source address and IP destination address. Information is stored in a control block called Leaf, which contains at least the Key (as will be seen later, the stored bit pattern is actually the hashed Key). A leaf can also contain additional information, like aging information, or user information, which can for example be forwarding information like target blade and target port numbers.

There are tree types (FM, LPM and SMT) and associated tree type searches, namely: fixed match, software managed tree and largest prefix match. An optional additional criterium for checking the leaf during a tree search is the VectorMask. Roping, aging and a latch are used to increase search performance.

Figure 14:
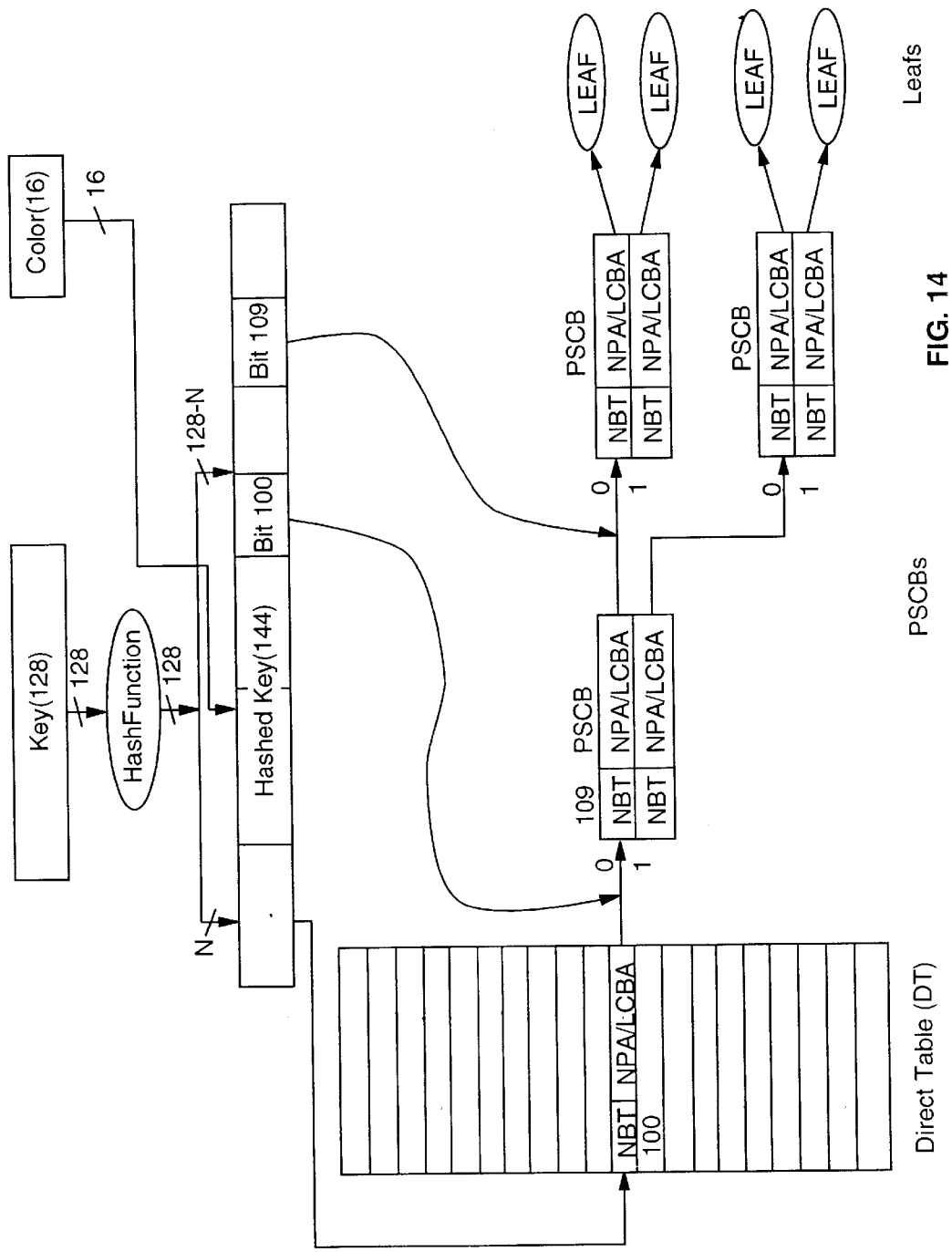
FIG. 14 shows a flowchart for the Fixed Match(FM) search algorithm.

The search algorithm for FM trees is shown in FIG. 14. The search algorithm operates on input parameters, which include the Key, performs a hash on the Key, accesses a Direct Table (DT), walks the tree through Pattern Search Control Blocks (PSCBs) and ends up at a Leaf (FIG. 14). There are three types of trees, each with its own search algorithm, which causes the tree-walk to occur according to different rules. For example, for Fixed Match (FM) trees, the datastructure is a Patricia Tree. When a Leaf has been found, this Leaf is the only possible candidate that can match the input Key. For Software Managed Trees, there can be multiple Leafs that are chained in a linked list. In this case, all Leafs in the chain are checked with the input Key, until a match has been found or until the chain has been exhausted. A so-called "compare at the end" operation, which compares the input Key with the pattern stored in the Leaf, verifies if the Leaf really matches the input Key. The result of the search will be OK when the Leaf has been found and a match has occurred, or KO in all other cases.

The input to a search operation consists of the following parameters:

HashedKey register are used to calculate an index into the Direct Table (DT).

The search starts with an access into the Direct Table: a DTEntry is read from the direct table. The address used to read the DTEntry is calculated from the N highest bits of the HashedKey, as well as on tree-properties as defined in the LUDefTable. This is explained in detail below. The DTEntry can be seen as the root of a tree. The particular tree datastructure that is used depends on the tree-type. At this point it suffices to say that a Patricia Tree datastructure is used for FM trees, and extensions to Patricia Trees for LPM and SMT trees.

An example of the use of an 8 entry DT is shown in FIG. 15. It can be seen that the search time (i.e., the number of PSCBs that must be accessed) can be reduced by using a DT. Thus, by increasing the DT size, a trade-off can be made between memory usage and search performance.

As can be seen from FIG. 15, a DTEntry can contain the following information:

Empty. There are no Leafs attached to this DTEntry.

A pointer to a Leaf. There is a single Leaf attached to this DTEntry.

A pointer to a PSCB. There are more than one Leafs attached to this

DTEntry. The DTEntry defines the root of a tree.

| | |
|---|---|
| Key | (128 bits). The Key must be built using special picocode instructions prior to the search (or insert/delete). There is only one Key register. However, after the tree search has started, the Key register can be used by the picocode to build the key for the next search, concurrently with the TSE performing the search. This is because the TSE bashes the Key and stores the result in an internal HashedKey register (thus, in reality, there are 2 Key registers). |
| KeyLength | (7 bits). This register contains the length of the Key in bits. It is automatically updated by hardware during building of the Key. |
| LUDefIndex | (8 bits). This is an index into the LUDefTable, which contains a full definition of the tree in which the search occurs. The LUDefTable is described in detail later. |
| TSRNr | (1 bit). The search results can be stored either in Tree Search Result Area 0 (TSR0) or TSR1. This is specified by TSRNr. While the TSE is searching, the picocode can access the other TSR to analyze the results of a previous search. |
| VectorIndex | (8 bits). For trees which have the VectorMask enabled (which is specified in the LUDefTable), the VectorIndex denotes a bit in the VectorMask. At the end of the search, the value of this bit is returned and can be used by picocode. |

The input Key will be hashed into a HashedKey, as shown in FIG. 14. There are six fixed hash algorithms available (one "algorithm" performs no hash function). It is specified in the LUDefTable which algorithm will be used. A programmable hash function may be used to add flexibility.

The output of the hash function is always a 128-bit number, which has the property that there is a one-to-one correspondence between the original input Key and the output of the hash function. As will be explained below, this property minimizes the depth of the tree that starts after the Direct Table.

If colors are enabled for the tree, which is the case in the example of FIG. 14, the 16-bit color register is inserted in the 128-bit hash function output. The insertion occurs directly after the Direct Table. I.e., if the Direct Table contains $2^N$ entries, then the 16-bit color value is inserted at bit position N, as shown in the figure. The output of the hash function, together with the inserted color value (when enabled), is stored in the HashedKey register.

The hash function is defined such that most entropy in its output resides in the highest bits. The N highest bits of the The Search Algorithm for a software managed tree and algorithm for generating the tree is set forth in U.S. patent application Ser. No. 09/312,148, now U.S. Pat. No. 6,222,380, and is incorporated herein by reference.

An algorithm termed "Choice Bit Algorithm" uses a certain metric to build a binary search tree based upon bits selected from items termed "rules" in a set or universe of rules. All our examples are couched in terms of Internet Protocol (IP) headers, but a fixed format header of any type could be used instead.

In IP, each Rule pertains to certain Keys which might be built with the following subsections: Source Address (SA), Destination Address (DA), Source Port (SP), Destination Port (DP), and Protocol (P). These data are respectively 32, 32, 16, 16, and 8 bits long and so a Key to be tested consists of 104 bits. The Choice Bit Algorithm finds certain of the 104 bits which are especially useful. Testing the few bits in effect eliminates all but one or all but a few rules from possible application. For some rules, testing inequalities by means of simple compare operations are also appropriate. The bit tests and compares are logically organized in a binary tree. The tree is mapped into a hardware enabled structure that tests bits at high speeds. Such testing results in just one rule or a small number of rules (called a leaf chain) which the Key might fit. In the former case, the Key is then tested in full by the rule. In the latter case, the Key is then tested in a lattice of tests using compares and full rule tests.

Each rule in the rule set is associated with an action which is taken if the rule is the highest priority rule which fits the key. Rules can intersect (one key fits two or more rules). In that case, rules can be given priority numbers 1, 2, 3, . . . , so that any two intersecting rules have different priorities (an administrator must declare which rule dominates if a key fits two or more). Thus if more than one rule remains to be tested after the bit tests and compares, the rules are tested in order of priority. A lower priority number designates a rule with higher priority.

If no fit is found at all, some default provision may be specified.

The search algorithm for the longest Prefix Matching method is set forth in U.S. Pat. No. 5,787,430, incorporated herein by reference. The method requires entering at a node of said database (root node); determining a search path from one node to another through said tree-like database by successively processing segments of said search argument which comprise only those parts of the entries which are necessary to identify the next (child) node, and said second link information until said segments are consumed or a (leaf) node lacking said second link information is reached; comparing with said search argument an entry stored in the node at which said search path ended; and if no at least partial match between the search argument and said entry is found in said current node, backtracking said search path by processing said first link information of said current node; and repeating the previous two steps until said at least partial match is found or said root node is reached.

Figure 16:
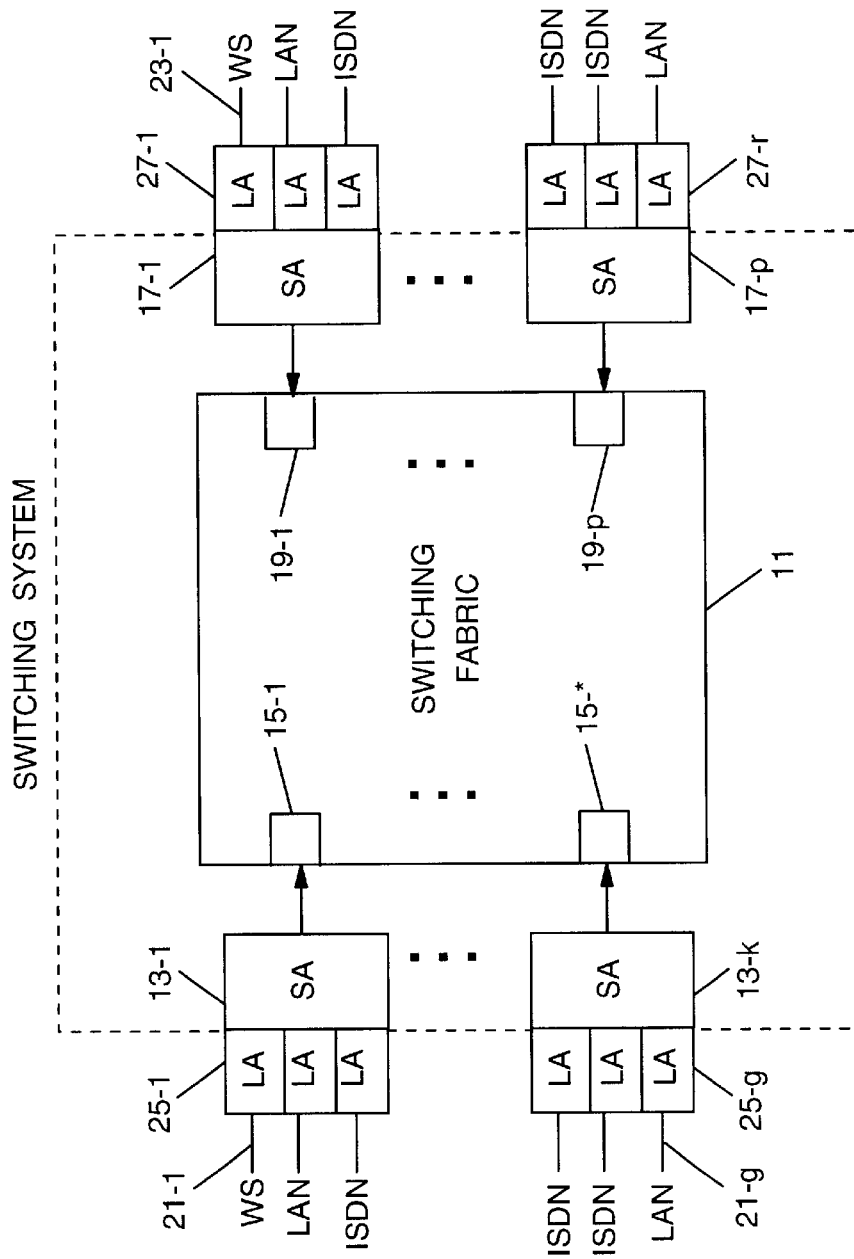
FIG. 16 shows a block diagram of a switching systems such as Prizma.

FIG. 16 shows an embodiment of the main switching system shown in FIG. 2. Preferably, each interface device chip (called Rainier) has at least two integrated parallel-to-serial system (DASL) which receive parallel data and convert the data to a high speed serial data stream which is forwarded over a serial link to the switching system. Data received from switching system on a high speed serial link is converted to parallel data by another DASL. An embodiment of the Serializer/Deserializer termed Data Align Serial Link (DASL) is described herein.

At least one DASL interfaces the switching fabric device to the serial links. Data from the serial link is converted into parallel data which is delivered to switching fabric device. Likewise, parallel data from switching fabric device is converted to serial data which is delivered to the serial links. The serial links can be aggregated to increase throughput.

Still referring to FIG. 16, the switching system includes switch fabric 11, input switch adapters 13 (13-I . . . 13-k) which are connected to the switch fabric input ports 15 (15-I . . . 15-k), and output switch adapters 17 (17-I . . . 17-p) which are connected to the switch fabric at output ports 19 (19-I . . . 19-p).

Incoming and outgoing transmission links 21 (21-I . . . 21-q) and 23 (23-I . . . 23-r) are connected to the switch system by line (link) adapters 25 (25-I . . . 25-q) and 27 (27-I . . . 27-r), respectively. The transmission links carry circuit switched or packet switched traffic from and to attached units such as work stations, telephone sets or the like (links designated WS), from and to local area networks (links designated LAN), from or to Integrated Services Digital Network facilities (links designated ISDN), or from and to any other communication systems. Furthermore, processors may be attached directly to switch adapters 13 and 17. The line adapters (LA) and switch adapters (SA) have a common interface.

At the input switch adapters, various services from packet switched and circuit switched interfaces are collected and converted into uniform minipackets (having one of several possible fixed lengths), with a header containing routing information designating the required output port (and outgoing link) of the switch. Some details on the minipacket format and on minipacket generation in the input switch adapters and on depacketization in the output switch adapters will be given in the next sections.

The switch fabric routes the minipackets via a fast self-routing interconnection network from any input port to any output port. The structure of the self-routing network is such that minipackets can be routed simultaneously internally without any conflicts.

The heart of the switching system is the switch fabric. Two different implementations are considered and will be described separately. In one implementation, the switch fabric comprises a self-routing binary tree for each input port, connecting the respective input port to all output ports; the switch fabric comprises k such trees in combination (if k input ports are provided). In the other implementation, a bus structure with an output RAM is provided as a slice for each output port, connecting all input ports to the respective output port; the switch fabric comprises p such slices in combination (if p output ports are provided).

DASL is described in application Ser. No. 09/330,968, filed 11 Jun. 1999 and incorporated herein by reference. The DASL Interface receives data from a parallel interface such as a CMOS ASIC, partitions the bits from the parallel interface into a smaller number of parallel bit streams. The smaller number of parallel bit streams are then converted into a high speed serial stream, which is transported via a transmission medium to the receiver of the other module. A differential driver with control impedance drives the serial bit stream of data into the transmission media.

DASL implements the method of parsing a data stream presented as N bits in parallel into a plurality of portions each having n bits, wherein n is a fraction of N; serializing each n bit portion of the data stream; transferring each serialized portion over a corresponding one of a plurality of parallel channels; and deserializing each transferred portion of the data stream to restore the data stream to presentation as N bits in parallel.

In the drawings and specifications there have been set forth preferred embodiments of the inventions here disclosed and, although specific terms are used, the description thus given uses terminology in a generic and descriptive sense only and not for purposes of limitation.

What is claimed is:

1. An apparatus comprising:

a semiconductor substrate;

N processing units fabricated on said substrate, wherein N>1;

internal instruction memory fabricated on said substrate, said instruction memory storing instructions accessible to said N processing units;

first internal data memory fabricated on said substrate, said data memory storing information accessible to said N processing units;

a dispatcher operatively coupled to the N processing units, said dispatcher prefetching input information units and assigning said input information units to the processors wherein the processors operate simultaneously to carry out the task associated with the assigned input information units; and a completion unit operatively coupled to the N processing units, said completion unit receiving output information units from the processing units and ordering the output information units to maintain a predetermined sequence.

2. The apparatus of claim 1 further including a memory controller fabricated on said substrate and operatively interposed between the processing units and the internal data memory, said memory controller being responsive to simultaneous requests from said processing units to provide simultaneous access to the data memory.

3. The apparatus of claim 1 or 2 further including a hardware classifier fabricated on the substrate and disposed to intercept information that is being transmitted by the dispatcher to the processing units and generate control information therefrom which is forwarded to the processing units and is used by said processing units to further process the intercepted information.

4. The apparatus of claim 3 further including a hardware generator fabricated on the substrate, said hardware generator generating a tag that relates to each piece of intercepted information and forwarding said tag to the completion unit wherein the completion unit uses the tag to assemble the output information from said processing units.

5. The apparatus of claim 1 further including:
a first data store interface unit; and
a second data store interface unit;
each data store interface unit being operatively coupled to the processing units and providing access for said processing units to read information or write information from or to off-chip data sources.

6. The apparatus of claim 1 further including second internal data memory fabricated on said substrate and storing data accessible to the processing unit.

7. The apparatus of claim 1 further including a bus structure (WEB) interconnecting resources such as registers, memories, etc.; and
a WEB arbiter responsive to requests from said processing units to provide access to a selected resource.

8. The apparatus of claim 7 further including:
a controller coupled to the bus structure (WEB) which, when activated, single steps instructions on a processing unit.

9. The apparatus of claim 1 wherein the at least one of the processing units includes:
a processing core having multiple General Purpose Registers (GPRs) and an Arithmetic Logic Unit (ALU); and
at least one co-processor coupled to the processing core.

10. The apparatus of claim 1 wherein selected ones of the processing units are structured to perform specialized tasks.

11. The apparatus of claim 1 further including hardware assist logic coupled to at least one of the processing units.

12. The apparatus of claim 1 further including a mailbox interface coupled to at least one of the processing units; and
a general purpose processor coupled to the mailbox interface.

13. An apparatus comprising:
a semiconductor substrate;
N processing units fabricated on said substrate, wherein N>5;
internal instruction memory fabricated on said substrate, said instruction memory storing instructions accessible to said N processing units;

first internal data memory fabricated on said substrate, said data memory storing information accessible to said N processing units;

a memory controller fabricated on said substrate and operatively interposed between the processing units and said first internal data memory, said memory controller being responsive to simultaneous requests from said processing units to provide simultaneous access to the data memory;

a dispatcher operatively coupled to the N processing units, said dispatcher prefetching input information units and assigning said input information units to the processors wherein the processors operate simultaneously to carry out the task associated with the assigned input information units;

a hardware classifier fabricated on the substrate and disposed to intercept information that is being transmitted by said dispatcher to said processing units and generate control information therefrom which is forwarded to said processing units and is used thereby to further process the intercepted information;

a first data store interface unit;

a second data store interface unit;

each data store interface unit being operatively coupled to said processing units and providing access for said processing units to read information or write information from or to data sources; and a completion unit operatively coupled to the N processing units, said completion unit receiving output information units from the processing units and ordering the output information units to maintain a predetermined sequence.

14. The apparatus of claim 13 further including a hardware generator fabricated on the substrate, said hardware generator generating a tag that relates to each piece of intercepted information and forwarding said tag to the completion unit wherein the completion unit uses the tag to assemble the output information from said processing units.

15. The apparatus of claim 13 further including second internal data memory fabricated on said substrate and storing data accessible to the processing unit.

16. The apparatus of claim 13 further including a bus structure (WEB) interconnecting resources such as registers, memories, etc.;
a WEB arbiter responsive to requests from said processing units to provide access to a selected resource; and
a controller coupled to the bus structure (WEB) which, when activated, single steps instructions on a processing unit.

17. A method comprising the steps of:
storing in an instruction memory instructions for the handling of data transiting an interface device;
executing in a plurality of interface processors the instructions stored in the instruction memory;
receiving information units in a data flow inbound through an input port;
prefetching input information units and assigning the input information units to the processors so that the processors operate simultaneously to carry out an instructed task associated with the assigned information units;
communicating the data flow as parsed and assigned information units through the plurality of interface processors; and
directing the data flow outbound through an output port in accordance with the execution of the instructions by the interface processors.

18. A method according to claim 17 further comprising parsing the data flow into a plurality of portions, storing selected portions of the parsed data flow in data memory, and directing other selected portions of the parsed data flow to a switching fabric for determination of an outbound direction.

19. A method according to claim 18 further comprising recombining the stored and other selected portions of the data flow prior to direction of the data flow outbound through an output port.

20. A method according to claim 17 wherein the step of communicating the data flow through the plurality of interface processors comprises parsing the data flow into portions and distributing the parsed portions among the plurality of interface processors for handling in parallel.

21. The apparatus of claim 7 further including a WEB Watch interface operatively coupled to the Web arbiter, said WEB Watch interface providing access to the bus structure from outside of the apparatus.

22. The apparatus of claim 13 further including a plurality of external data memories operatively coupled to said memory controller.

23. The apparatus of claim 13 wherein the first internal data memory includes a plurality of on chip memory.

24. The apparatus of claim 22 wherein the memory controller includes a plurality of Request Control Units wherein each one of the Request Control Units is operatively coupled to one of the N processing units;

a plurality of arbiter units wherein each one of the plurality of arbiter units provides access to one of the plurality of external data memories; and a bus structure operatively interconnecting the plurality of arbiter units and request control units in such a way that each request unit has access to multiple ones of the arbiter units wherein each of the N processing units has access to multiple memories.

25. A system comprising:

a support structure on which an electronic sub-asssembly and other electrical components are operatively mounted and interconnected, said sub-assembly including N processing units fabricated on a substrate, wherein N>1;

first internal data memory fabricated on said substrate, said data memory storing information accessible to said N processing units;

a dispatcher operatively coupled to the N processing units, said dispatcher prefetching input information units and assigning said input information units to the processors wherein the processors operate simultaneously to carry out the task associated with the assigned input information units; and a completion unit operatively coupled to the N processing units, said completion unit receiving output information units from the processing units and ordering the output information units to maintain a predetermined sequence.

26. The system of claim 25 further including:

internal instruction memory fabricated on said substrate, said instruction memory storing instructions accessible to said N processing units.

27. A method including the steps of:

providing a plurality of processors programmed to perform tasks;

receiving frames in at least one input port of a communication device;

partitioning the frames into information units;

prefetching selected information units into a dispatcher assigns the information units to idle ones of the plurality of processors wherein the processors operate simultaneously to carry out tasks associated with assigned information unit;

generating a tag for each information unit passed to the plurality of processors;

receiving in a completion unit information units from the processors; and using the tag associated with each information unit to arrange the information units into a predetermined sequence.

* * * * *